United States Patent [19]
Hon et al.

[11] Patent Number: 5,680,510
[45] Date of Patent: Oct. 21, 1997

[54] SYSTEM AND METHOD FOR GENERATING AND USING CONTEXT DEPENDENT SUB-SYLLABLE MODELS TO RECOGNIZE A TONAL LANGUAGE

[75] Inventors: Hsiao-Wuen Hon, Saratoga, Calif.; Bao-Sheng Yuan, Singapore, Singapore

[73] Assignee: Apple Computer, Inc., Cupertino, Calif.

[21] Appl. No.: 378,963

[22] Filed: Jan. 26, 1995

[51] Int. Cl.$^6$ .................................................. G10L 5/06
[52] U.S. Cl. .................... 395/2.64; 395/2.63; 395/2.65
[58] Field of Search ............................ 395/2.63, 2.64, 395/2.65, 2.42, 2.51, 2.55, 2.56, 2.59, 2.6, 2.61, 2.52

[56] References Cited

U.S. PATENT DOCUMENTS

| | | | |
|---|---|---|---|
| 4,803,729 | 2/1989 | Baker | 381/43 |
| 4,831,551 | 5/1989 | Schalk et al. | 395/2.42 |
| 4,985,924 | 1/1991 | Matsuura | 395/2.63 |
| 5,027,408 | 6/1991 | Kroeker et al. | 395/2.63 |
| 5,054,084 | 10/1991 | Tanaka et al. | 395/2.63 |
| 5,164,900 | 11/1992 | Bernath | 364/419.09 |
| 5,195,167 | 3/1993 | Bahl et al. | 395/2.63 |
| 5,212,638 | 5/1993 | Bernath | 364/419.09 |
| 5,220,639 | 6/1993 | Lee | 395/2 |
| 5,329,608 | 7/1994 | Bocchieri et al. | 395/2.63 |
| 5,450,523 | 9/1995 | Zhao | 395/2.65 |
| 5,473,728 | 12/1995 | Luginbuhl et al. | 395/2.65 |

OTHER PUBLICATIONS

Lin, Chih–Heng et al., "A New Framework For Recognition Of Mandarin Syllables With Tones Using Sub–Syllabic Units" *1993 IEEE International Conference on Acoustics, Speech, and Signal Processing*, Apr. 27–30, 1993: Speech Processing/vol. II of V (pp. II-227–II 230).

Hon, Hsiao–Wuen et al.; "Towards Large Vocabulary Mandarin Chinese Speech Recognition", *1994 IEEE International Conference on Acoustics, Speech, and Signal Processing*, Apr. 19–22, 1994: Speech Processing 1/vol. 1 (I–545—I–548).

Giachin, E. et al., "Word Juncture Modeling Using Inter-Word Context–Dependent Phone–Like Units", *Cselt Technical Reports*, Mar. 1992: vol. XX –No. 1 (pp. 43–47).

Wang, Hsin–min et al., "An initial Study On Large Vocabulary Continuous Mandarin Speech Recognition With Limited Training Data Based On Sub–Syllabic Models", *International Computer Symposium 1994.*, Dec. 12–15: vol. 2 (pp. 1140–1145).

Lawrence Rabiner & Bing–Hwang Juang, Fundamentals of Speech Recognition, pp. 461–464, date not provided.

W. Yang, et al., Hidden Markov Model for Mandarin Lexical Tone Recognition, Jul. 1988, IEEE Transactions on Acoustics, Speech and Signal Processing, vol. 36, pp. 988–992.

(List continued on next page.)

*Primary Examiner*—Krista M. Zele
*Assistant Examiner*—Scott Wolinsky
*Attorney, Agent, or Firm*—Fenwick & West, LLP

[57] ABSTRACT

A speech recognition system for Mandarin Chinese comprises a preprocessor, HMM storage, speech identifier, and speech determinator. The speech identifier includes pseudo initials for representing glottal stops that precede syllables of lone finals. The HMM storage stores context dependent models of the initials, finals, and pseudo initials that make the syllables of Mandarin Chinese speech. The models may be dependent on associated initials or finals and on the tone of the syllable. The speech determinator joins the initials and finals and pseudo initials and finals according to the syllables of the speech identifier. The speech determinator then compares input signals of syllables to the joined models to determine the phonetic structure of the syllable and the tone of the syllable. The system also includes a smoother for smoothing models to make recognitions more robust. The smoother comprises an LDM generator and a detailed model modifier. The LDM generator generates less detailed models from the detailed models, and the detailed model modifier smoothes the models with the less detailed models. A method for recognizing Mandarin Chinese speech includes the steps of arranging context dependent, sub-syllable models; comparing an input signal to the arranged models; and selecting the arrangement of models that best matches the input signal to recognize the phonetic structure and tone of the input signal.

26 Claims, 16 Drawing Sheets

OTHER PUBLICATIONS

L. Lee, et al., Golden Mandarin (II)—an improved single--chip real-time Mandarin dictation machine for Chinese language with very large vocabulary, Proceedings Int. Conf. Acoustics, Speech & Signal Processing, 1993, vol. II, pp. 503–506.

Schwartz & Chow, The N-Best Algorithm: An Efficient and Exact Procedure for Finding the N Most Likely Sentence Hypotheses, 1990, IEEE, pp. 81–84.

F. Jelinek & R. Mercer, Interpolated Estimation of Markov Source Parameters from Sparse Data, in Pattern Recognition in Practice, edited by E. Gelsema & L Kanal, 1980 pp. 381–397.

Y. Wang, S. Chen & J. Shieh, Tone Recognition of Continuous Mandarin Speech Based on Hidden Markov Model, 1994, International Journal of Pattern Recognition and Artificial Intelligence vol. 8, pp. 233–245.

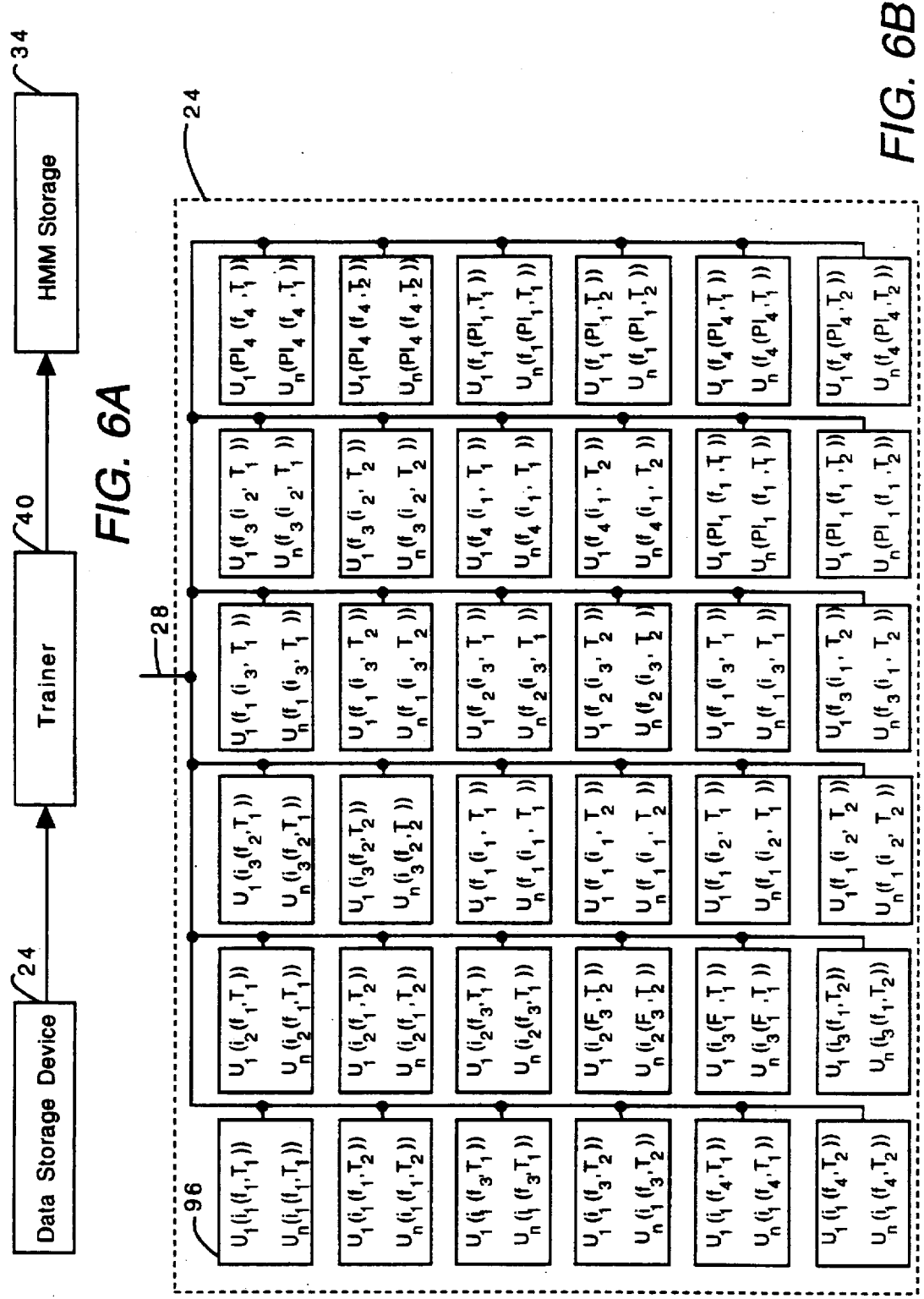

SYSTEM AND METHOD FOR GENERATING AND USING CONTEXT DEPENDENT SUB-SYLLABLE MODELS TO RECOGNIZE A TONAL LANGUAGE

CROSS-REFERENCE TO RELATED APPLICATIONS

The present invention relates to pending U.S. patent application Ser. No.: 08/316,257, filed Sep. 30, 1994, invented by Hsiao-Wuen Hon, Yen-Lu Chow, and Kai-Fu Lee, entitled "Continuous Mandarin Chinese Speech Recognition System Having An Integrated Tone Classifier," which is incorporated herein by reference. The present invention also relates to pending U.S. patent application Ser. No.: 08/315,222, filed Sep. 29, 1994, invented by Hsiao-Wuen Hon, entitled "A System And Method For Determining The Tone Of A Syllable Of Mandarin Chinese Speech," which is incorporated herein by reference.

BACKGROUND OF THE INVENTION

1. Field of the Invention

The present invention relates generally to speech recognition systems. In particular, the present invention relates to a system and method for generating context dependent sub-syllable models of a tonal language and for using context dependent, sub-syllable models to recognize a tonal language.

2. Description of The Background Art

In recent years, speech recognition systems have been used with greater frequency as input devices for inputting data and commands into computer and electronic systems. Dictation is a convenient and efficient method for users to transfer data and commands to computer and electronic systems. This is particularly true for users who speak languages such as Mandarin Chinese and Japanese. Unlike Western languages, Mandarin Chinese does not use an alphabet. Written words of Mandarin Chinese are represented by pictographic characters. There are 6,000 simplified Mandarin Chinese characters and more than 10,000 traditional Mandarin Chinese characters. Keyboard systems for inputting Mandarin Chinese characters are extremely sophisticated in order to input so many characters. Furthermore, keyboards require extensive training, over several months, of operators. For most users, entering commands and data through a keyboard configured for Mandarin Chinese is slow and tedious. For Mandarin Chinese, the most natural and most efficient technique for entering data and commands into computer and other electronic systems is dictation.

Speech recognition systems have been developed for recognizing speech. These systems are used for inputting commands and data into computer systems. Such systems have met with a degree of success when used with western languages such as Romance or Germanic languages. Speech recognition systems for Mandarin Chinese and other tonal languages, however, encounter unique problems not encountered by speech recognition systems for Germanic or Romance languages. Words of Mandarin Chinese speech are made up of one or more syllables. Each character of Mandarin Chinese typically represents a syllable of speech. Each syllable is a combination of a phonetic structure and a tone. There are 4 lexical tones and one neutral tone in Mandarin Chinese speech. Syllables having the same phonetic structure but different tones, have distinct meanings. Thus, to identify correctly a syllable, a speech recognition system must identify both the phonetic structure and tone of the syllable.

Each syllable includes a final and may include an initial. (The phonetic structure of a syllable is shown in FIG. 1.) Initials are consonants and finals begin with a vowel or diphthong. In Mandarin Chinese, there are 21 initials and 38 finals. There are also certain syllables that are finals without initials. Together, an initial and a final of a syllable comprise the phonetic structure of the syllable. There are potentially 3,990 syllables (possible combinations of initials and finals) of Mandarin Chinese speech. Not all possible combinations of initials, finals, and tones, however, define valid syllables. There are approximately 408 valid initial and final combinations, and approximately 1,229 meaningful tonal syllables.

Prior art speech recognition systems for Mandarin Chinese generally include a sub-system for identifying the phonetic structure of a syllable and a separate sub-system for identifying the tone of the syllable. Both sub-systems suffer from deficiencies such that speech recognition systems for Mandarin Chinese do not perform at an acceptable level. Mandarin Chinese speech contains many sub-sets of syllables which are confusable. Conventional systems and methods for determining phonetic structure often confuse similar syllables. Current systems for identifying the phonetic structure of syllables of Mandarin Chinese speech mis-identify the phonetic structure of syllables at such a rate as to be intolerably inaccurate. Furthermore, conventional techniques of determining the phonetic structure of an entire syllable require large amounts of training data and large amounts of memory. These techniques also do not allow for inter-syllable identification.

Systems for identifying the tone of syllables also do not perform sufficiently well. Most tone identification systems use short-term tonal analysis to determine the tone of a syllable. Short-term tonal analysis, however, does not provide sufficient resolution to identify accurately the tone of a syllable. To overcome this problem, some systems use long-term tonal analysis to identify a syllable's tone. Long-term tonal analysis is computationally expensive and, therefore, slow. Systems for receiving dictation must recognize speech in real time. It is difficult to achieve real time recognition when using long-term tonal analysis. As this discussion of prior art tone identification shows, prior art speech recognition systems assume that the tone of a syllable is independent of its phonetic structure. Thus, current speech recognition systems for tonal languages are inadequate for current needs. There continues to be a need for increased accuracy and speed in systems and methods for recognizing Mandarin Chinese speech.

SUMMARY OF THE INVENTION

The present invention overcomes the deficiencies and limitations of the prior art with a system and method for recognizing Mandarin Chinese speech. The system advantageously determines the phonetic structure and tone of a syllable simultaneously. A speech recognition system comprises a pre-processor, a Hidden Markov Model (HMM) storage, a speech identifier, and a speech determinator.

The speech identifier includes an initial field or pseudo initial field for every final field. For syllables that have both an initial and a final, an initial field stores a textual representation of the initial and a final field stores a textual representation of the final. For syllables that are lone finals, the speech identifier includes a pseudo initial field and a final field. The pseudo initial field stores a textual representation of a pseudo initial. A pseudo initial represents a glottal stop which generally precedes syllables that are lone finals. The pseudo initials greatly improve the recognition of lone finals.

The HMM storage stores models of the initials, pseudo initials, and finals that make up the syllables of Mandarin Chinese speech. Models of initials and pseudo initials may advantageously be dependent on the finals with which they may be joined. Similarly, models of finals may be dependent on initials with which the finals may be joined. The models of initials, pseudo initials, and finals may also depend on tones of Mandarin Chinese speech. The HMM storage and speech identifier are coupled to the speech determinator. The speech determinator is also coupled to the pre-processor. The speech determinator receives a processed input from the pre-processor. The speech determinator also receives sub-syllable models from the HMM storage and valid syllables from the speech identifier. The speech determinator arranges the sub-syllable models according to the valid syllables and compares the resulting syllable models to the processed input. From the comparison, the speech determinator recognizes the phonetic structure and tone of the input. Using context dependent models, the speech determinator can not only more accurately determine the phonetic structure of a syllable, but can also determine the tone of the syllable. The present invention, thus, does not require separate tonal analysis to determine the tone of a syllable of a tonal language.

The models require a large amount of training data for their generation. The present invention provides for adjustments of the complexity of the models according to the available training data. The models of initials and finals may be dependent on the corresponding initial or final only, dependent on tone only, or context independent. The present invention includes a smoother for improving the models. The smoother comprises a Less Detailed Model (LDM) generator and detailed model modifier. The LDM generator is coupled to the HMM storage and generates less detailed models from existing models. The detailed model modifier receives the less detailed models from the LDM generator and the models from the HMM storage. The detailed model modifier then smoothes the models according to the less detailed models. An output of the detailed model modifier is coupled to the HMM storage. The smoothed models are transferred to the HMM storage to replace the un-smoothed models. The resulting smoothed models allow the present invention to recognize syllables more accurately, especially when there is limited training data.

The present invention includes a method for recognizing a tonal language using context dependent, sub-syllable models. The method comprises the steps of arranging models of initials, pseudo initials, and finals that are dependent on associated initial, pseudo initial, or final and dependent on tone; comparing a processed input to the arranged models; selecting the arranged models that best match the input; and generating an output signal indicative of the initial, or pseudo initial, final, and tone of the best matching arranged models.

BRIEF DESCRIPTION OF THE DRAWINGS

FIG. 6A is a block diagram showing the flow of data and signals in the system of the present invention when training models stored in the HMM storage;

FIG. 6B is a block diagram of the data storage device according to the present invention;

DETAILED DESCRIPTION OF THE PREFERRED EMBODIMENTS

Figure 1:
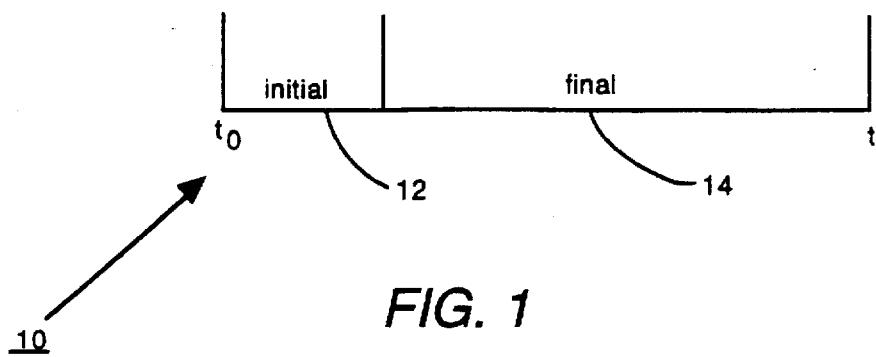
FIG. 1 is a graphical representation of a syllable of Mandarin Chinese speech.

Referring now to FIG. 1, a graphical representation of a syllable 10 of Mandarin Chinese speech is shown. The syllable 10 comprises an initial 12 and a final 14. The initial 12 is a consonant, and the final 14 commences with a vowel. The initial 12 corresponds to an initial portion of a syllable and the final 14 corresponds to a final portion of a syllable.

The present invention advantageously includes context dependencies when determining the initial and final of a syllable to identify the phonetic structure of the syllable. In identifying the initial and final, the present invention more accurately determines the phonetic structure of the syllable and advantageously identifies the tone of the syllable.

Figure 2:
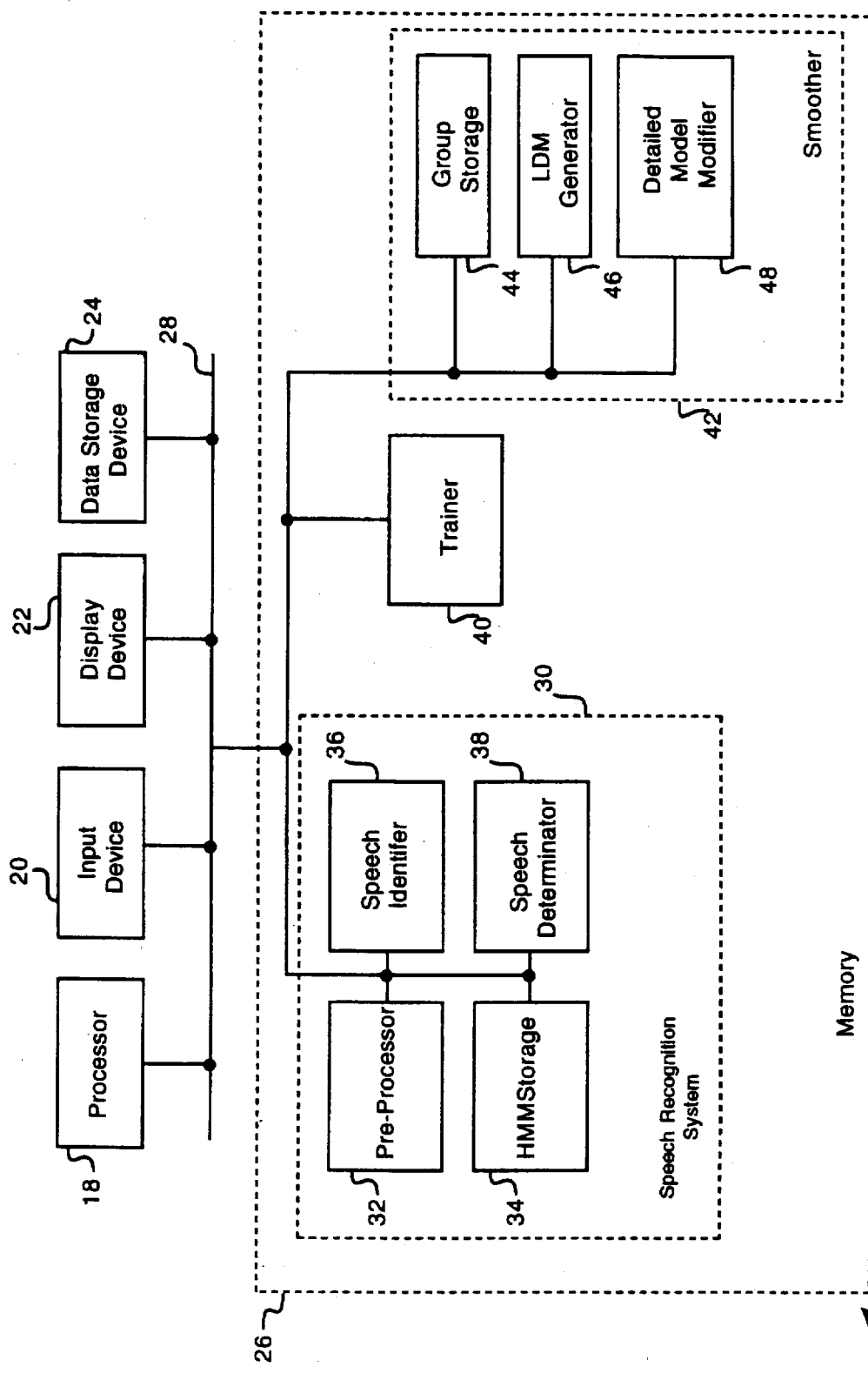
FIG. 2 is a block diagram of a system for recognizing Mandarin Chinese speech constructed according to the present invention.

Referring now to FIG. 2, a block diagram of a system 16 for recognizing Mandarin Chinese speech, constructed in accordance with the present invention, is shown. The system 16 preferably comprises a processor 18, an input device 20, a display device 22, a data storage device 24, and a memory 26. The processor 18, input device 20, display device 22, data storage device 24, and memory 26, are coupled in a von Neuman architecture via a bus 28 such as in a personal computer. The processor 18 is preferably a microprocessor such as a Motorola 68040; the display device 20 is preferably a video monitor; the data storage device 24 comprises random access memory ("RAM") and read only memory ("ROM") for storing data and is preferably a disk drive; the memory 26 comprises RAM and ROM for storing data and program instruction steps. The input device 20 comprises a keyboard, mouse type controller, microphone, and analog-to-digital ("A/D") converter. The bus 28 is a conventional bus for transferring data and commands. In the preferred embodiment, the system 16 is a Macintosh Quadra 840AV computer system from Apple Computer, Inc. of Cupertino, Calif. Those skilled in the art will realize that the system 16 could also be implemented on an IBM personal computer or other computer systems.

The memory 26 comprises a speech recognition system 30, a trainer 40, and a smoother 42. While the speech recognition system 30, trainer 40, smoother 42, and their constituent parts of the memory 26 will now be discussed below as separate devices, those skilled in the art will realize that the component parts may occupy contiguous sections of a single memory space and, in the preferred embodiment, are routines stored in the memory 26 that when executed by the processor 18 operate as a speech recognition system, a trainer, and a smoother.

The speech recognition system 30 comprises a pre-processor 32, a Hidden Markov Model (HMM) storage 34, a speech identifier 36, and a speech determinator 38. The pre-processor 32 receives an input signal of a digitized syllable from the input device 20 and processes the digitized syllable for recognition. The pre-processor 32 uses conventional methods of processing the input. The pre-processor 32 preferably performs a fast fourier transform ("FFT") on the digitized signal, which represents a syllable, received from the input device 20. The pre-processor 32 may alternately determine a linear predictive coding ("LPC") of the digitized signal. In yet another alternative, the pre-processor 32 may generate a vector quantization of either the FFT or LPC. There are many other methods of pre-processing a digitized syllable; those skilled in the art will recognize these methods and that these methods may be use in the pre-processor 32. The pre-processor 32 has an input coupled to the input device 20, so as to receive the digitized signal, by the bus 28. The pre-processor 32 also has an output coupled to the speech determinator 38 by the bus 28, and the pre-processor 32 transfers the processed, digitized signals to the speech determinator 38 over the bus 28.

The HMM storage 34 holds hidden Markov models of initials and finals that make up the possible syllables of Mandarin Chinese speech. Hidden Markov models are used to model speech, handwriting, and other signals. Those skilled in the art will recognize hidden Markov models. The HMM storage 34 will be discussed below in greater detail with reference to FIG. 4. The HMM storage 34 has an output that is coupled to the speech determinator 38 by the bus 28 in order to provide the models to the speech determinator 38.

The speech identifier 36 holds representations of all valid combinations of initials and finals of a tonal language such as Mandarin Chinese. The speech identifier 36 describes the entire Mandarin Chinese language. The speech identifier 36 will be discussed in greater detail below with reference to FIG. 3. The speech identifier 36 is coupled to the speech determinator 38 by the bus 28.

The speech determinator 38 is a device that uses the initials and finals stored in the speech identifier 36 and the models stored in the HMM storage 34 to determine the phonetic structure and tone of a syllable that has been processed by the pre-processor 32. The speech determinator 38 arranges the models it receives from the HMM storage 34 according to the arrangements of initials and finals held in the speech identifier 36. The present invention preferably uses hidden Markov models of the initials and finals. A model of an initial may be appended to a model of a final to form a model of a complete syllable The speech determinator 38 compares the processed input, received from the pre-processor 32 to the arranged models and determines the arrangement of models that best matches the processed input. The speech determinator 38 uses conventional techniques, such as a viterbi search, or dynamic programming, to compare the arrangements of models to the processed input. The speech determinator 38 includes memory for holding data so that it may hold models of syllables, created by appending sub-syllable models of initials and finals, internally when determining the identity of a syllable. The speech determinator 38 is coupled to the pre-processor 32, HMM storage 34, speech identifier 36, and processor 18 by the bus 28.

The trainer 40 generates the models of the initials and finals of Mandarin Chinese speech. The trainer 40 uses utterances stored in the data storage device 24 as inputs to generate the models. The trainer 40 and utterances, stored in the data storage device 24, will be described in detail below with reference to FIGS. 6A and 6B. After generating the models, the trainer 40 transfers them to the HMM storage 34. The trainer 40 is coupled to the data storage device 24, and the HMM storage 34 by the bus 28.

The smoother 42 modifies the hidden Markov models in the HMM storage 34 so the speech determinator 38 can better use them to identify syllables. The smoother 42 receives the models stored in the HMM storage 34 and modifies the models to describe better the initials and finals of Mandarin Chinese speech. Alternately, the smoother 42 may receive the models directly from the trainer 40 and, after smoothing, may transfer the models to the HMM storage 34. The smoother 42 comprises a group storage 44, a Less Detailed Model (LDM) generator 46, and a detailed model modifier 48. The group storage 44, LDM generator 46, and detailed model modifier 48 each have an input and an output coupled to the bus 28. The group storage 44, LDM generator 46, and detailed model modifier 48 will be discussed in detail with reference to FIG. 7. The smoother 42 is coupled to the processor 18, HMM storage 34, and trainer 40 by the bus 28.

Figure 3:
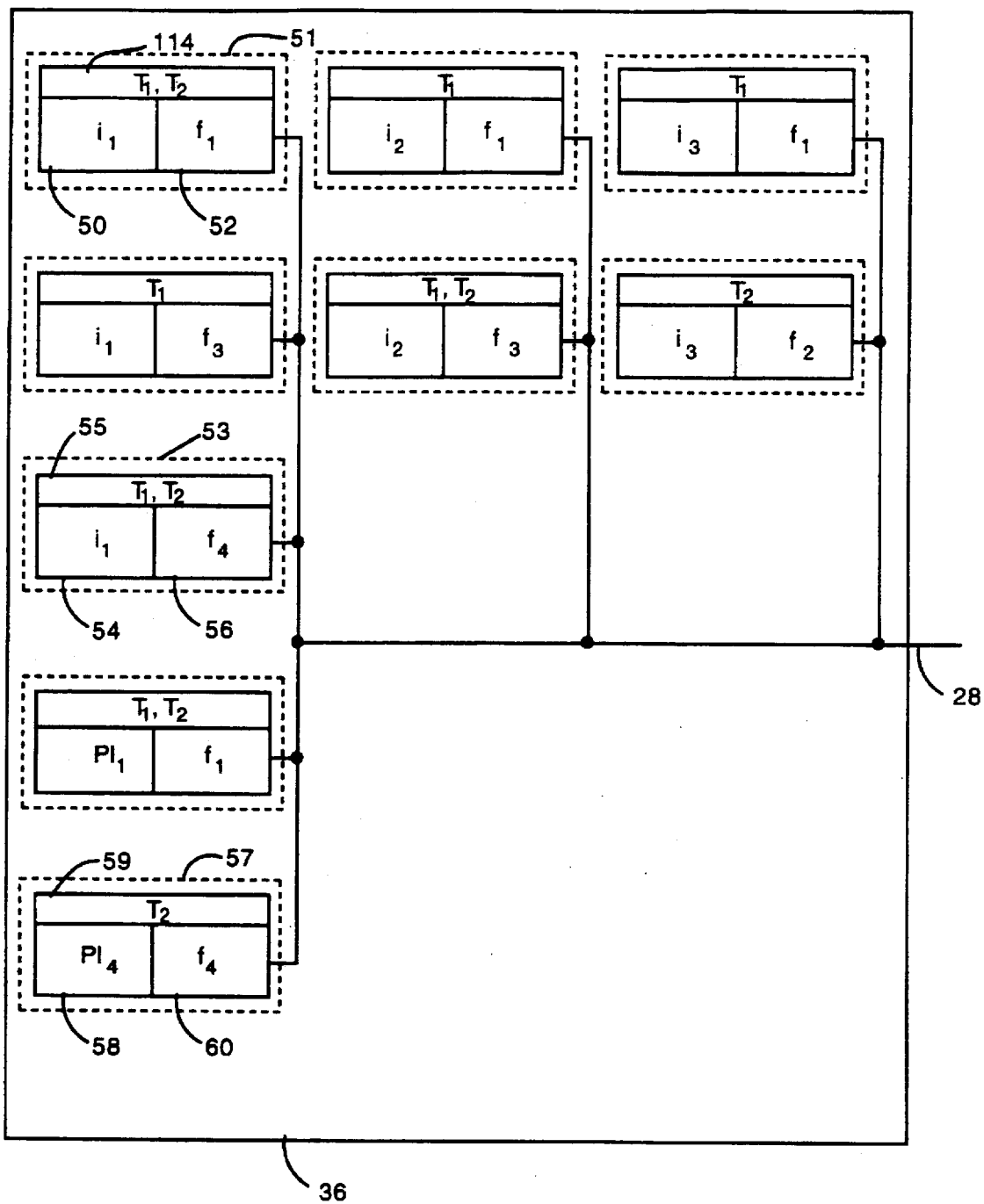
FIG. 3 is a block diagram of a speech identifier constructed according to the present invention.

Referring now to FIG. 3, a block diagram of an exemplary embodiment of the speech identifier 36 is shown. This embodiment of the speech identifier 36 is for an exemplary tonal language. In this exemplary tonal language, there are 3 initials, 4 finals, and 2 tones. This tonal language is used to demonstrate more easily and clearly the structure and function of the HMM storage 34 and speech identifier 36. Those skilled in the art will realize how the HMM storage 34 and speech identifier 36 are scaled up for Mandarin Chinese or any other actual language that has many more initials, finals, and tones as well as particular valid combinations thereof.

The speech identifier 36 stores all, valid combinations of initials and finals, with tones, for the language of the speech to be recognized. The speech identifier 36 comprises a plurality of syllable fields. Each syllable field comprises an initial field, a final field, and a tone field. The initial field and final field of a syllable field together define a valid syllable of the tonal language. The tone field stores a representation of the tones which the syllable may have. Not all valid syllables may have all tones of the tonal language. Thus, a syllable field 51 has an initial field 50 that identifies initial $i_1$, and has a final field 52 that identifies final $f_1$. Syllable field 51 also has a tone field 114 that identifies the tones that the syllable $/i_1\ f_1/$ may have. For the 2 tone example language, a tone field comprises 2 bits with 01 representing $T_1$ only, 10 representing $T_2$ only, and 11 representing $T_1$ and $T_2$. Initial field 50 and final field 52 are paired together to describe syllable $/i_1\ f_1/$. For example, $i_1$ may be /b/ and $f_1$ may be /at/. Thus, the initial of field 50 with final field 52 describes the syllable /bat/. Tone field 114 indicates that the syllable /bat/ may have $T_1$ or $T_2$ as a tone. The syllable fields are coupled to the bus 28.

As has been stated, the speech identifier 36 describes all valid syllables of the exemplary language. Another syllable is described by a syllable field 53. Syllable field 53 has an initial field 54 and a final field 56. Initial field 54 contains a reference to $i_1$, and final field 56 contains a reference to final $f_4$. Continuing the example above, $i_1$ is /b/, and $f_4$ may be /it/. The pairing of initial field 54 and final field 56 describes the syllable /bit/. Syllable field 53 also has tone field 55. Tone field 55 contains an indicator that the syllable /$i_1$ $f_4$/ may have either tone $T_1$ or tone $T_2$.

FIG. 3 shows the preferred embodiment of syllable fields for syllables that do not have an initial. The present invention advantageously utilizes a pseudo initial for syllables that do not have an initial, and are lone finals. Conventional, prior art speech recognition systems model lone finals as the appropriate final alone. The human voice, however, is not capable of generating an acoustical signal of a final alone. The human voice always generates a glottal stop that precedes the lone final. Conventional speech recognition systems have difficulty recognizing lone finals. The present invention advantageously uses pseudo initials in the speech identifier 36 to identify glottal stops. Pseudo initials are treated as initials. For example, a syllable field 57 comprises a pseudo initial field 58 for holding a pseudo initial $PI_4$ and a final field 60. Syllable field 57 includes a tone field 59 which holds an indicator that the syllable /$f_4$/ may only have tone $T_2$. The exemplary language used with FIG. 3 has 2 pseudo initials, $PI_1$ and $PI_4$. For Mandarin Chinese, the present invention uses 6 pseudo initials. The preferred form of the pseudo initials, with their paired finals, are listed in Appendix A. The pseudo initials are matched with the corresponding finals according to the beginning vowel of the final. For example the pseudo initial AH—A is matched with all lone finals that begin with the vowel A. The speech identifier 36 advantageously provides a pairing of an initial field with a final field to describe all valid syllables.

Figure 4:
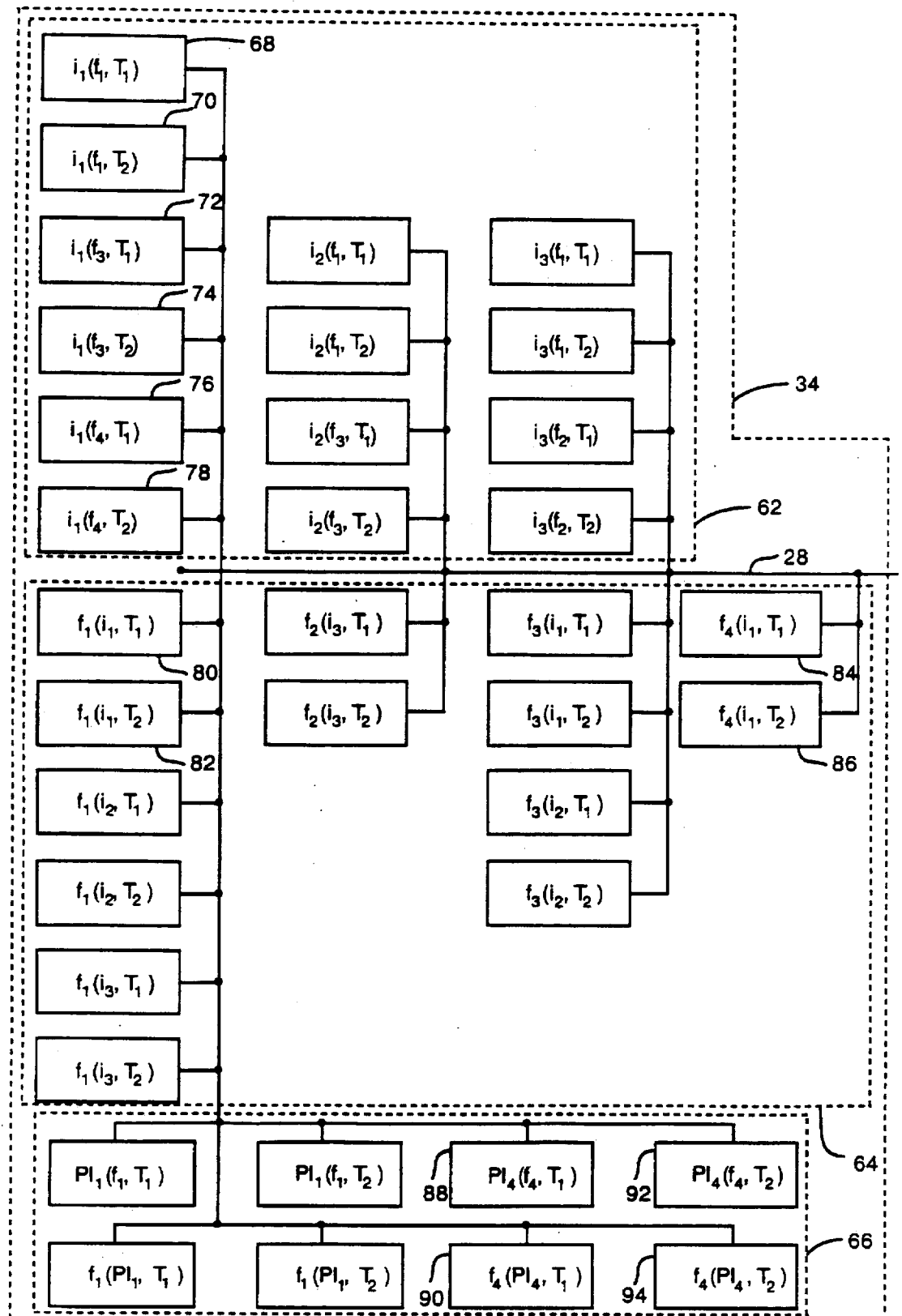
FIG. 4 is a block diagram of an HMM storage constructed according to the present invention.

Referring now to FIG. 4, a block diagram of the HMM storage 34, constructed according to the present invention, is shown. The HMM storage 34 holds hidden Markov models for each initial, final, and pseudo initial that is listed in the speech identifier 36. The HMM storage 34 comprises 3 groups of models: a first group 62 stores models of initials, a second group 64 stores models of finals, and a third group 66 stores models of pseudo initials and lone finals. The present invention is advantageously flexible in the detail of the models. FIG. 4 shows the most detailed models of the present invention. The HMM storage 34, may be configured, however, to hold less detailed models. The level of detail of the models depends on the amount of training data available.

Prior art speech recognition systems provided single models for each initial and final. In contrast, the present invention provides context dependent, sub-syllable models for identifying Mandarin Chinese speech. The models are dependent on their associated initial or final and on the tone of the syllable. Thus, when identifying an initial, the speech determinator 38 includes the final, with which the initial is paired, and the tone of the syllable as factors in the making the identifying determination. Where the prior art had 1 model of $i_1$ of the exemplary language, the present invention has 6 models of $i_1$. The present invention preferably makes many more comparisons in order to include context dependencies in the determination. Each model held in the HMM storage 34 is preferably a hidden Markov model of an initial, final, or pseudo initial. Those skilled in the art will realize that the HMM storage 34 may hold other forms of models of initials, finals, and pseudo initials.

The speech determinator 38 receives the possible syllables from the speech identifier 36 and the models from the HMM storage 34. The speech determinator 38 then arranges the models according to the syllables received from the speech identifier 36. For example, to construct the syllable described by syllable field 51, the speech determinator 38 will join a model of $i_1$, which is dependent on $f_1$ and $T_1$, with a model of $f_1$, which is dependent on $i_1$ and $T_1$. A model 68 of $i_1$, dependent on $f_1$ and $T_1$, is held in the HMM storage 34, and a model 80 of $f_1$, dependent on $i_1$ and $T_1$, is held in the HMM storage 34. The speech determinator 38 also uses models of the syllable, having different tones. Towards this end, the speech determinator 38 joins a model 70 of $i_1$, dependent on $f_1$ and $T_2$, with a model 52 of $f_1$, dependent on $i_1$ and $T_2$. Note that in the most detailed case, each pairing of fields in the speech identifier 36 results in multiple models, one for each tone of the language. Note further that when the speech determinator 38 joins tone dependent models, it always joins models having the same tone dependency. The model stored in field 70, $i_1$ dependent on $f_1$ and $T_2$, is never paired with the model stored in field 80, $f_1$ dependent on $i_1$ and $T_1$. Finally, note that the combination of an initial, dependent on a final, when paired with a final, dependent on the initial, is a syllable dependency. In other words, equivalent to the initial, dependent on the syllable, and the final, dependent on the syllable.

The speech determinator 38 generates models of the valid syllables of the tonal language by joining together models of initials and finals or pseudo initials and finals. The present invention advantageously uses hidden Markov models of initials, pseudo initials, and finals since hidden Markov models may be appended together to form models of larger structures such as syllables. Those skilled in the art will realize how to append hidden Markov models of finals to hidden Markov models of initials or pseudo initials to form hidden Markov models of syllables.

As has been stated, the models stored in this embodiment of the HMM storage 34 shown in FIG. 4 are the most detailed sub-syllable models. The present invention, however, may be used with less detailed sub-syllable models. For example, the models need not be dependent on the associated initial or final. In this case, each model would be dependent only on the tone of the syllable. Alternately, the models may be tone independent and dependent on the associated initial or final. Finally, some of the models may be context independent, that is dependent on neither associated initial, associated final, or tone. The various possible combinations lead to a hierarchy of models. The parent model is a context independent model. In this case, an initial or final has a single model that describes all occurrences of the initial or final. In the context independent model, dependency on associated initial or final and tone of the syllable is not modeled. The context independent model may refined into two sets of context dependent models. A first set of context dependent models is dependent on the tone of the syllable only. A second set of context dependent models is dependent on the associated initial or final only. These two sets of context dependent models converge to form a yet more detailed context dependent model. In this most context dependent model, the models are dependent on the associated initial or final and dependent on the tone of the syllable. FIG. 4 shows this most detailed context dependent set of models.

Each more detailed set of models requires a greater amount of training data than the preceding less detailed set of models to generate the models. Where training data is limited, it may be advantageous to use a less detailed set of models. The context dependency of the models need only be consistent within the groups 62, 64, and 66. Thus, the initials in the first group 62 may be dependent only on tone, and the finals in the second group 64 may be dependent only on associated initial. In general the most detailed models are preferred. When there is limited training data, however, the initials of the first group 62, dependent on final only, and the finals of group 64, dependent on tone only, is preferred.

The third group 66 comprises data fields that store models of the pseudo initials and finals associated with the pseudo initials. The present invention treats the pseudo initials as it treats the initials. For example, to form the syllable described by syllable field 57 of the speech identifier 36, the speech determinator 38 joins the model pseudo initial model 88, $PI_4$ ($f_4$, $T_1$) and final model 90, $f_4$ ($PI_4$, $T_1$) from the HMM storage 34 and joins pseudo initial model 92, $PI_4$ ($f_4$, $T_2$), and final model 94, $f_4$ ($PI_4$, $T_2$), from the HMM storage 34. The same hierarchy of context independent and context dependent models apply to pseudo initials and associated finals as apply to initials and finals. That is, models of pseudo initials may be context independent, dependent on the associated final only, dependent on the tone of the syllable only, or dependent on the associated final and tone of the syllable.

FIG. 4 also illustrates how the present invention determines the tone of a syllable without using tonal analysis. So long as a tone dependent model is used for either the initial or final, the speech determinator 38 determines the tone of the syllable from the comparison of the processed input to the models. Thus, the present invention advantageously determines both the phonetic structure of a syllable and the tone of the syllable simultaneously.

Figure 5:
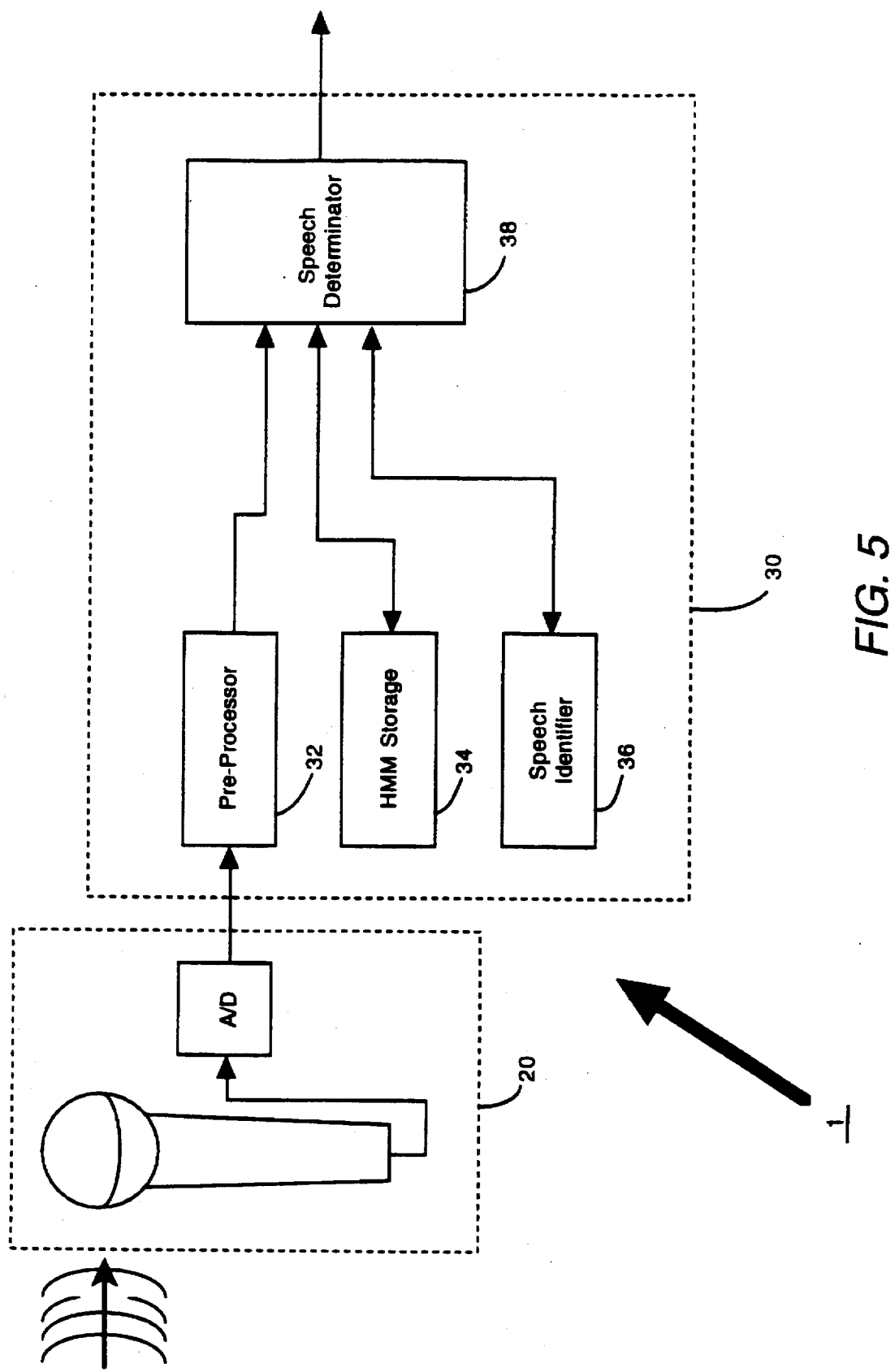
FIG. 5 is a block diagram showing the flow of signals and data in the system for recognizing Mandarin Chinese speech.

Referring now to FIG. 5, a block diagram of the flow of data and the processing of signals in the system 16 is shown. An audio signal is received by the system 16 through the input device 20. The input device 20 includes a microphone and an A/D converter. The microphone receives the analog, audio signal and converts it into an analog, electrical signal. The A/D converter receives the analog, electrical signal and converts it into a digital, electrical signal. The A/D converter then transmits the digital, electrical signal to the speech recognition system 30.

Within the speech recognition system 30, the pre-processor 32 receives the digital, electrical signal. The pre-processor 32 generates an FFT signal of the digital, electrical signal and then generates a signal of the coefficients of the FFT signal. The pre-processor 32 may alternately generate a signal of a linear predictive coding of the digital, electrical signal. The pre-processor 32 then transmits the processed signal to the speech determinator 38. The speech determinator 38 receives the signals and generates a signal to the speech identifier 36 to transfer the possible syllables. The speech determinator 38 receives the signals indicative of the possible syllables from the speech identifier 36 and generates a signal to the HMM storage 34 to transfer the models of initials and finals. When the speech determinator 38 receives the signals of the models from the HMM storage 34, the speech determinator 38 joins the models together according to the syllable signals received from the speech identifier 36. The speech determinator 38 joins an initial and final together by appending the final to the end of the initial. The speech determinator 38 similarly joins pseudo initials with finals by appending the final to the end of the pseudo initial. The speech determinator 38 then compares the processed signal from the pre-processor 32 to the joined models of initials and finals. The speech determinator 38 uses a viterbi search, or dynamic programming, to determine the appended model that best matches the speech signal. In this way, the speech determinator 38 compares the input signal to all valid syllable models of Mandarin Chinese. The speech determinator 38 then generates and outputs a signal indicating the initial, final, and tone of the joined model that it determined best matched the signal received from the pre-processor 32. The speech determinator 38 may transmit the output signal to a look-up table or memory device. The memory device may store the signal as in a conventional word processor. The look-up table may determine the appropriate character that represents the syllable and may transmit a signal to the display device 22 to display the selected character.

The present invention, as described above, is configured to recognize syllables of Mandarin Chinese speech. Syllables are the fundamental unit of Mandarin Chinese speech and recognition of syllables is the most general form of speech recognition. The present invention may alternately be configured to recognize higher linguistical units such as words, phrases, sentences, or any higher unit. For example, to recognize 3 possible input sentences, the speech identifier 36 would be configured with fields to indicate the syllables that make up each sentence. After the speech determinator 38 receives the processed input signal from the pre-processor 32, the speech determinator 38 receives the sentence signals from the speech identifier 36 and the model signals of the initials, finals, and pseudo initials from the HMM storage 34. The speech determinator 38 then joins the models together according to the sentences. The speech determinator 38 compares the input received from the pre-processor 32 to the joined models and selects the set of joined models that most closely matches the input. The speech determinator 38 generates and outputs a signal indicating the sentence that it determined most closely matched the input sentence.

Referring now to FIGS. 6A and 6B. FIG. 6A is a block diagram showing the flow of data and signals in the system 16 when the trainer 40 is generating the models held in the HMM storage 34. The trainer 40 receives a plurality of utterances, each utterance having the initial, pseudo initial, or final for which the trainer 40 is generating a model, from the data storage device 24. The trainer 40 may alternately receive signals of the utterances from another section of the memory 26. All the utterances the trainer 40 receives have the desired linguistical structure for which the trainer 40 it is generating a model. For example, if the trainer 40 is generating a model of $i_1$, dependent on $f_1$ and $T_1$, then the trainer 40 receives signals of utterances of syllables having $i_1$, $f_1$, and $T_1$. The trainer 40 uses conventional techniques, such as Baum-Welch training, to generate a hidden Markov model. The trainer 40 receives at least 20 utterances to generate an adequate model. Preferably, the trainer 40 receives several hundred utterances to generate a model. Once the trainer 40 has generated a model, it generates a signal to transfer the model to the HMM storage 34.

FIG. 6B is a block diagram showing the data storage device 24 in greater detail. The data storage device 24 comprises a plurality of cells that store utterances having a common initial, final, or pseudo initial and common dependencies. Cell 96 stores utterances having $i_1$, $f_1$, and $T_1$. The cells store the utterances that the trainer 40 will use to generate models. For example, the trainer 40 uses the utterances stored in cell 96 to generate the model of $i_1$, dependent on $f_1$ and $T_1$. The trainer 40, after generating the model, transfers the model to the HMM storage 34. The HMM storage 34 holds the model, generated in the immediately above example, in field 68. The speech determinator 38 uses the model 68 held in the HMM storage 34 to model the syllable identified by syllable field 51 of the speech identifier 36. Each cell holds at least 20 utterances and preferably holds hundreds of utterances. The exemplary language requires 36 cells in the data storage device 24. This means that the data storage device 24 holds at least 720 utterances and preferably holds thousands of utterances. To generate the models necessary to recognize Mandarin Chinese, the data storage device 24 requires hundreds of cells to hold utterances having the various initials, finals, tones, and glottal stops. Each cell holding at least 20 utterances and preferably holding hundreds of utterances. Those skilled in the art will realize how to modify the data storage device 24 for Mandarin Chinese.

Figure 7:
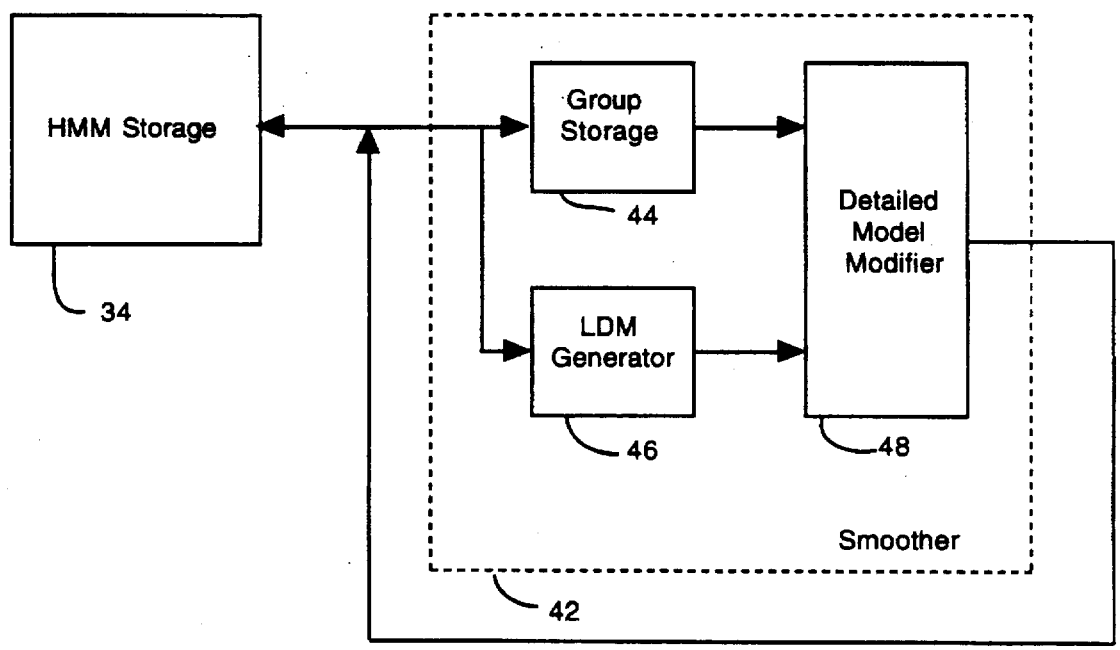
FIG. 7 is a block diagram showing the flow of signals and data in a system for smoothing models of the present invention.

Referring now to FIG. 7. FIG. 7 is a block diagram showing the flow of data and signals when the system 16 is using the smoother 42 to modify the models held in the HMM storage 34. As can be seen from FIG. 6B and accompanying text, the most detailed set of models, dependent on initial or final and on tone, requires an enormous amount of training data. Preferably there is sufficient training data for the trainer 40 to generate accurate, robust models that are the most detailed. If there is not sufficient training data for the trainer 40 to generate accurate, robust models, the models may not adequately describe the initials, finals, and pseudo initials of the language. In this case, the smoother 42 may improve the models by smoothing them with less detailed models.

A less detailed model has fewer context dependencies. For example, models dependent on tone only or models dependent on initial or final only are less detailed than models that are dependent on tone and initial or final. Context independent models are the least dependent models.

More detailed models may be smoothed by any less detailed model. Thus, the most detailed models, dependent on initial or final and tone, may be smoothed with models, dependent on initial or final only, dependent on tone only, or context independent. Similarly, the less detailed models may be smoothed with even less detailed models. For example, the model dependent on initial or final only may be smoothed with the context independent model, and the model dependent on tone only may be smoothed with the context independent model. As is shown in FIG. 7, the smoother 42 receives the models from the HMM storage 34. The LDM generator 46 sends a signal to the HMM storage 34 to generate a signal of the model to be smoothed and to transmit the signal to the smoother 42. The smoother 42 preferably receives the models in each group together. That is, the smoother 42 receives the initials of the first group 62, then receives the finals of the second group 64, and then receives the pseudo initials with associated finals of the third group 66. The smoother 42 determines the less detailed models, and smoothes the models with the less detailed models. The smoother 42 then returns the smoothed models to the HMM storage 34.

As can be seen in FIG. 7, the smoother 42 comprises a group storage 44, an LDM generator 46, and a detailed model modifier 48. When a group of models is received by the smoother 42, the group is received by the group storage 44 and by the LDM generator 46. The group storage 44 is a data storage device for holding the models while the LDM generator 46 is generating a less detailed model and while the detailed model modifier 48 is modifying individual models of the group.

The LDM generator 46 generates the less detailed model that the detailed model modifier 48 will use to modify the more detailed models. The LDM generator 46 uses the more detailed models to generate the less detailed model. If the smoother 42 is smoothing the models of the initials of the first group 62 with models dependent on final only, the LDM generator 46 generates the less detailed models, models of initials dependent on final only, from the initials of the first group 62. The LDM generator 46 generates a less detailed model by determining the arithmetic mean of the models having similar dependencies. To continue the example, the model 68 would be smoothed by a model of $i_1$ that is dependent on $f_1$ only. To generate a model of $i_1$ dependent on $f_1$ only, the LDM generator 46 determines the arithmetic mean of the model 68 and the model 70. The models 68 and 70 are both of $i_1$, are both dependent on $f_1$, and differ only in their dependency on tone. The model that is the arithmetic mean of the models 68 and 70 is a model of $i_1$ that is dependent on $f_1$ alone and is independent of tone. Similarly, to generate a model of $i_1$ that is dependent on $f_4$ alone, the LDM generator 46 determines the arithmetic mean of the model 76 and the model 78. The result is a model of $i_1$ that is dependent on $f_4$ but is independent of $T_1$ or $T_2$. In the same way the LDM generator 46 determines models dependent on tone only and independent of initial or final. To determine a model of $i_1$ that is dependent on $T_1$ only, the LDM generator 46 determines the arithmetic mean of the models 68, 72, and 76. The resulting model of $i_1$ is dependent on $T_1$ only. The LDM generator 46 uses this same method to determine the parent, context independent, model. To generate a context independent model of $i_1$, the LDM generator 46 determines the arithmetic mean of the models 68, 70, 72, 74, 76, and 78.

The LDM generator 46 determines an arithmetic mean of models on a point by point basis. The LDM generator 46 determines the arithmetic mean of corresponding points in each model, the resulting series of mean points is the arithmetic mean model and is a less detailed model.

Once the LDM generator 46 has generated the less detailed model, the LDM generator 46 generates a signal indicative of the less detailed model and transmits the signal to the detailed model modifier 48. The detailed model modifier 48 also receives signals indicative of the models to be smoothed from the group storage 44. The detailed model modifier 48 then smoothes these models, received from the group storage 44, with the less detailed models using conventional smoothing techniques such as linear interpolation or deleted interpolation. Those skilled in the art will recognize these techniques. The detailed model modifier 48 then generates a signal to transfer the smoothed models to the HMM storage 34. The HMM storage 34 receives the signals from the smoother 42 and replaces the original model with the smoothed model received from the smoother 42. The resulting smoothed models are less detailed than before smoothing, yet they are better and more robustly model the initials, finals, and pseudo initials.

In an alternate embodiment, the smoother 42 does not include a group storage 44. The group of models is received by the LDM generator 46 and transferred to the detailed model modifier 48. The detailed model modifier 48 receives the models directly from the HMM storage 34.

The models stored in the HMM storage 34 may be smoothed by any less detailed model, by combinations of less detailed models, and by different combinations of less detailed models. Preferably, however, the models of a group 62, 64, or 66 are smoothed similarly within each group. For example, the initials of the first group 62 may be smoothed with models dependent on tone only, the finals of the second group 64 may be smoothed with models dependent on initial only, and the pseudo initials and associated finals of the third group 66 may be smoothed with models dependent on tone only and with the context independent models. Any other combination of less detailed models is possible.

The group storage 44 has an input coupled to the bus 28 to receive signals from the HMM storage 34 and has an output coupled to the detailed model modifier 48 through the bus 28. The LDM generator 46 has an input coupled to the HMM storage 34 and an output coupled to the detailed model modifier 48 by the bus 28. The detailed model modifier 48 has a first input coupled to the group storage 44, a second input coupled to the LDM generator 46, and an output coupled to the HMM storage 34 by the bus 28.

Figure 8:
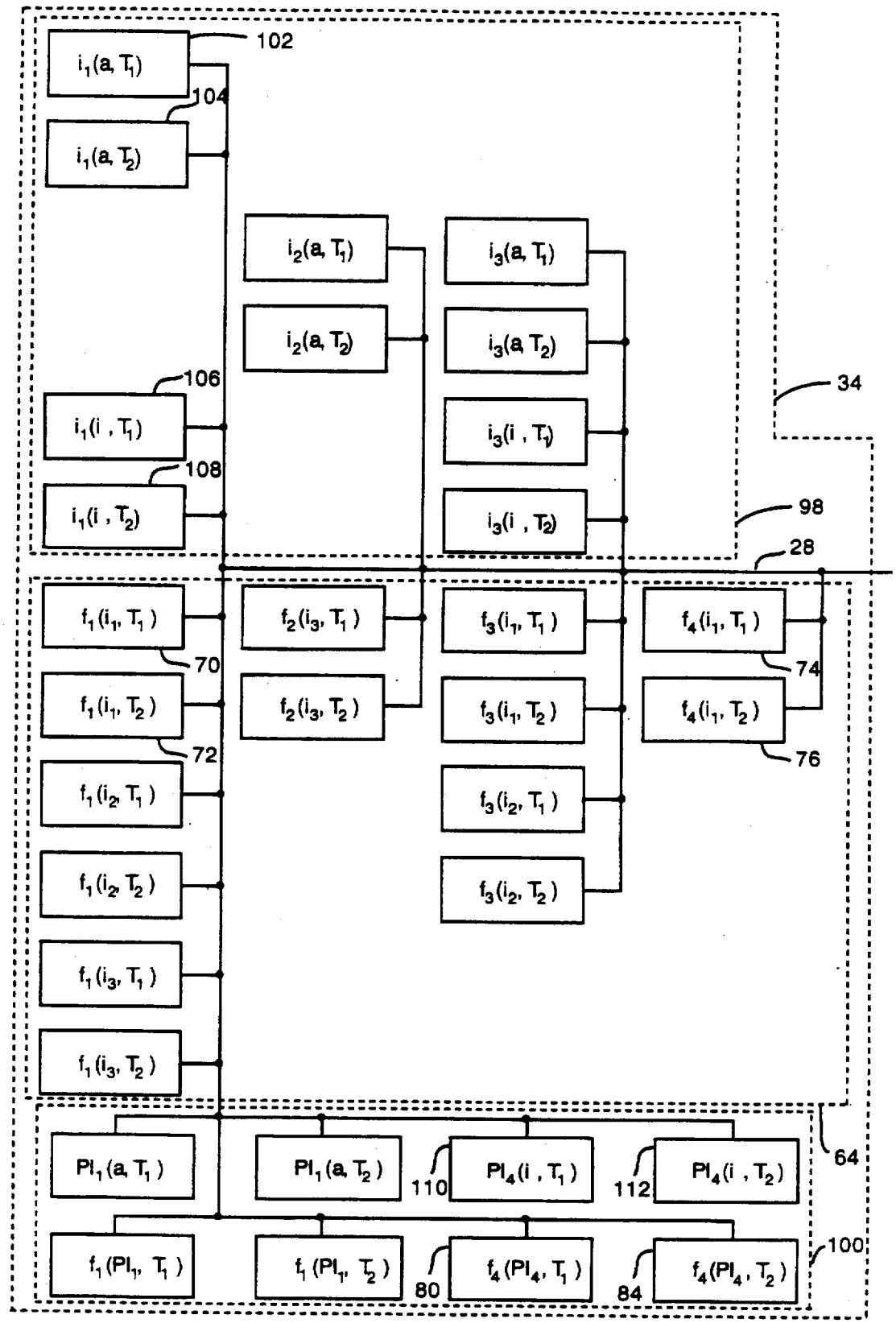
FIG. 8 is a block diagram of a second embodiment of an HMM storage constructed according to the present invention.

Referring now to FIG. 8, a block diagram of a second embodiment of the HMM storage 34 is shown. The most detailed set of models, shown in FIG. 4, include a large number of models. FIG. 8 shows an embodiment of the HMM storage 34 where the number of models, in the most detailed case, are reduced as compared to the number of models shown in FIG. 4.

In the most detailed set of models, initials are dependent on final and tone. The final dependency, however, can be substantially captured by a dependency on the beginning vowel of the final. Thus, vowel dependency replaces final dependency for initials. This reduces the number of models.

The HMM storage 34 shown in FIG. 8 comprises a first group 98 for initials, a second group 64 for finals, and a third group 100 for pseudo initials. The second group 64 is identical to that shown in FIG. 4. The first group 98 for initials comprises fewer fields than the first group 62. Expanding upon the exemplary language described above with reference to FIG. 3, $f_2$ will be /is/, and $f_3$ will be /am/. By basing the initial dependency on the vowel of the final rather than the full final, the second embodiment of the HMM storage 34 reduces the number of models necessary to describe initials. The model 68 and the model 70, $i_1$ dependent on $f_1$, may be combined with the models 72 and 74, $i_1$ dependent on $f_3$. Finals $f_1$ and $f_3$ both begin with the vowel /a/. Thus, for initial dependency these finals may be combined. The resulting models of $i_1$, dependent on beginning vowel /a/ and tone, are models 102 and 104. Similarly, initial dependency on $f_2$ and $f_4$ may be combined since both finals begin with /i/. Models 106 and 108 are models of $i_1$ dependent on /i/ and tone. The third group 100 also uses beginning vowel dependency instead of full final dependency. Model 110 is a model of $PI_1$, dependent on /i/ and $T_1$, instead of a model of $PI_1$, dependent on $f_4$ and $T_1$, as was model 88.

By using vowel dependency, the present invention reduces the number of models and the number of comparisons made by the speech determinator 38. Since these are more finals than initials in Mandarin Chinese, this reduces the size of the HMM storage 34 significantly and increases the robustness of the resulting models.

Figure 9:
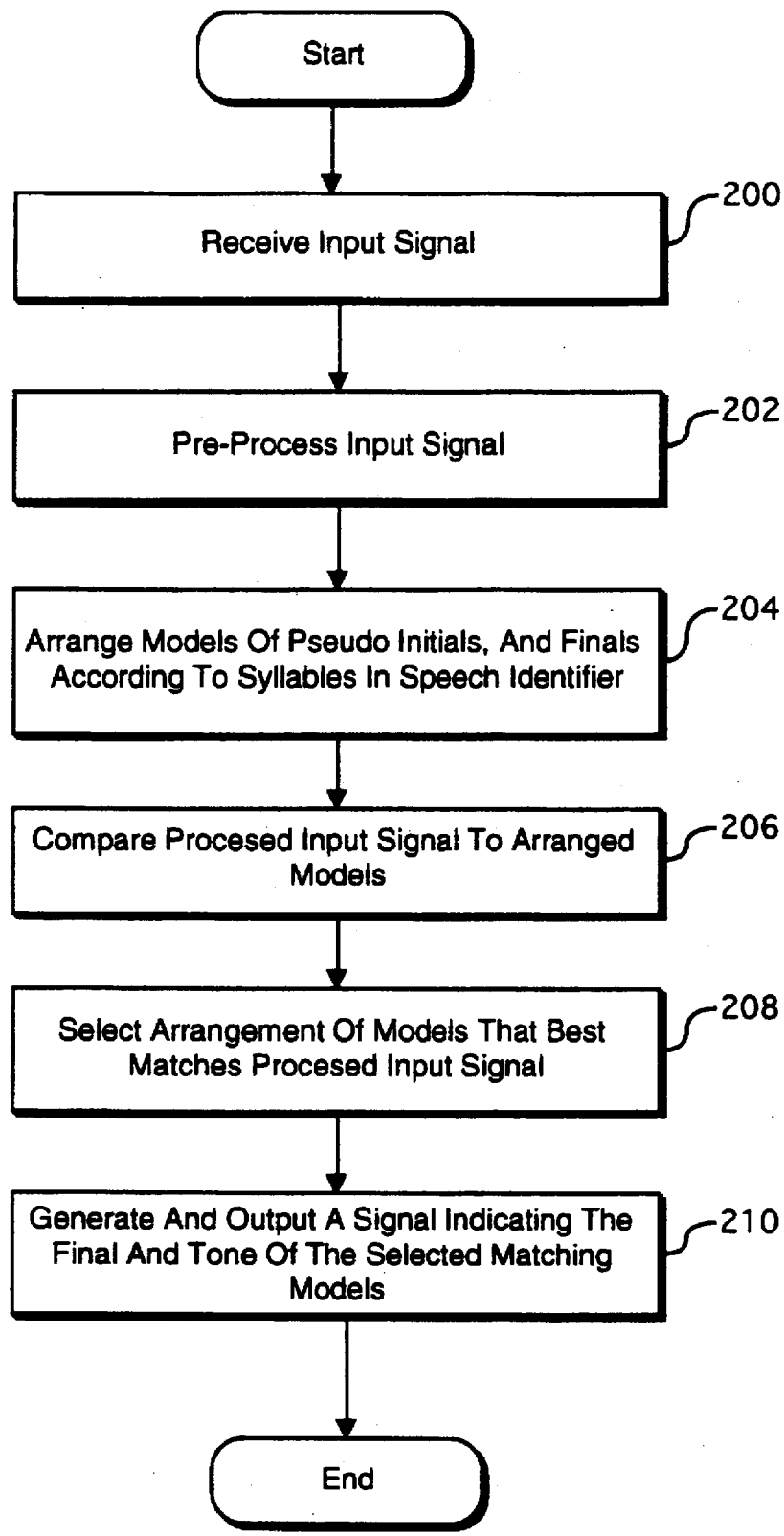
FIG. 9 is a flow chart showing a method for recognizing syllables of lone finals according to the present invention.

Referring now to FIG. 9, a method for recognizing a syllable of Mandarin Chinese speech that comprises a lone final, using the present invention, will be described. The method begins in step 200 where the system 16 receives an input audio signal of a syllable of Mandarin Chinese speech. The micro-phone of the input device 20 converts the audio signal into an analog, electrical signal. The A/D converter of the input device 20 then converts the analog, electrical signal into a digital, electrical signal. In step 202, the pre-processor 32 of the speech recognition system 30 receives the digital, electrical signal for pre-processing. The pre-processor 32 determines a FFT of the digital, electrical signal and then determines a vector quantization of the FFT. The pre-processor 32 may alternately determine an LPC instead of the FFT. Next, in step 204, the speech determinator 38 receives models of pseudo initials and finals from the HMM storage 34; the speech determinator 38 arranges and joins the models together according to syllables received from the speech identifier 36. The speech determinator 38 compares the processed input signal to the arranged models in step 206 and selects the arrangement of models that best matches the processed input signal in step 208. In this way, in step 206, the speech determinator 38 compares the input signal not only to a model of the lone final but also to a model of the glottal stop represented by the pseudo initial that precedes the lone final. In step 210, the speech determinator 38 generates and outputs a signal indicating the final and tone of the arrangement of models selected in step 208, and the method ends.

Figure 10A:
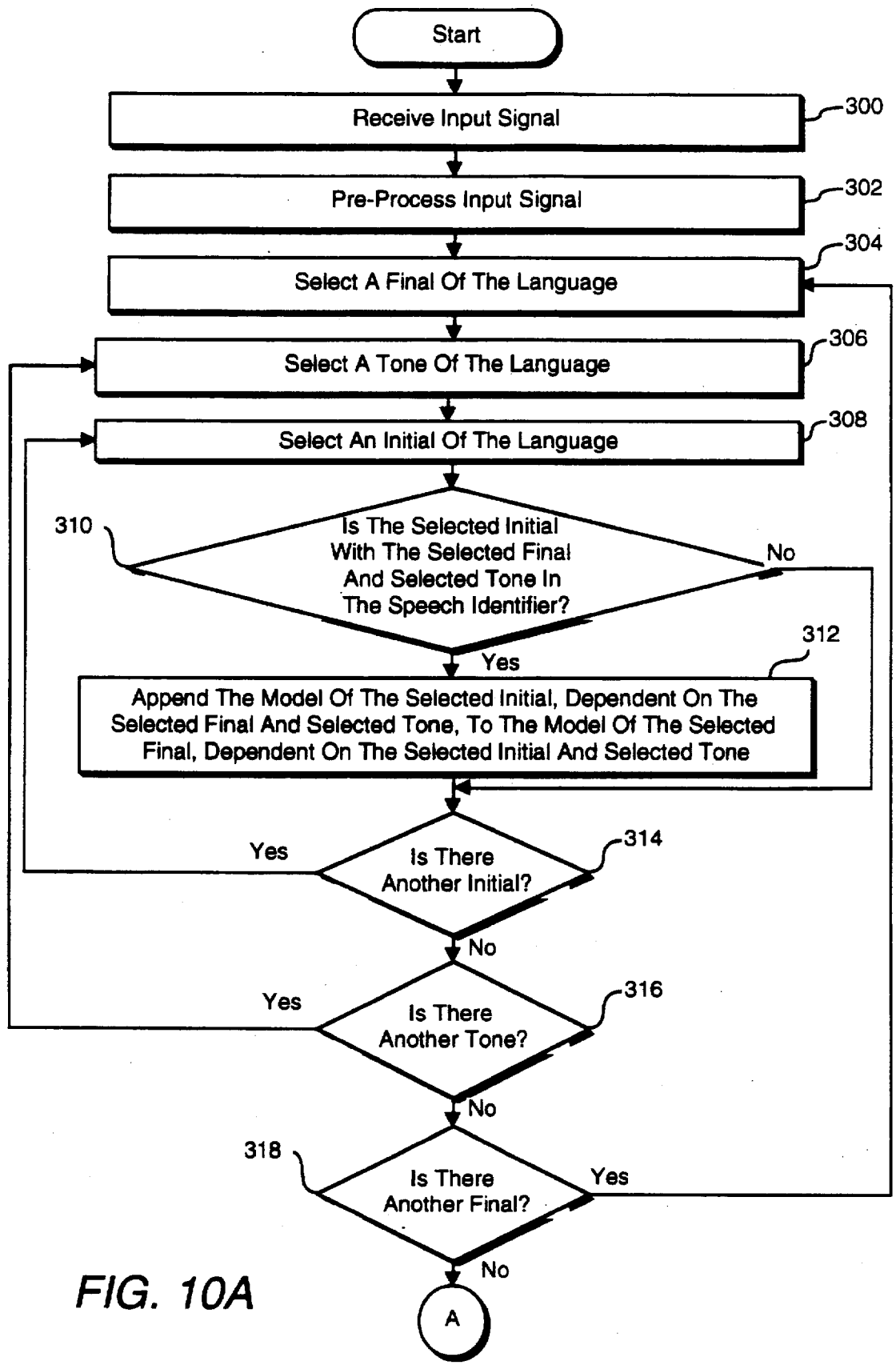
FIGS. 10A and 10B are flow charts showing a method for recognizing syllables of Mandarin Chinese speech.
Figure 10B:
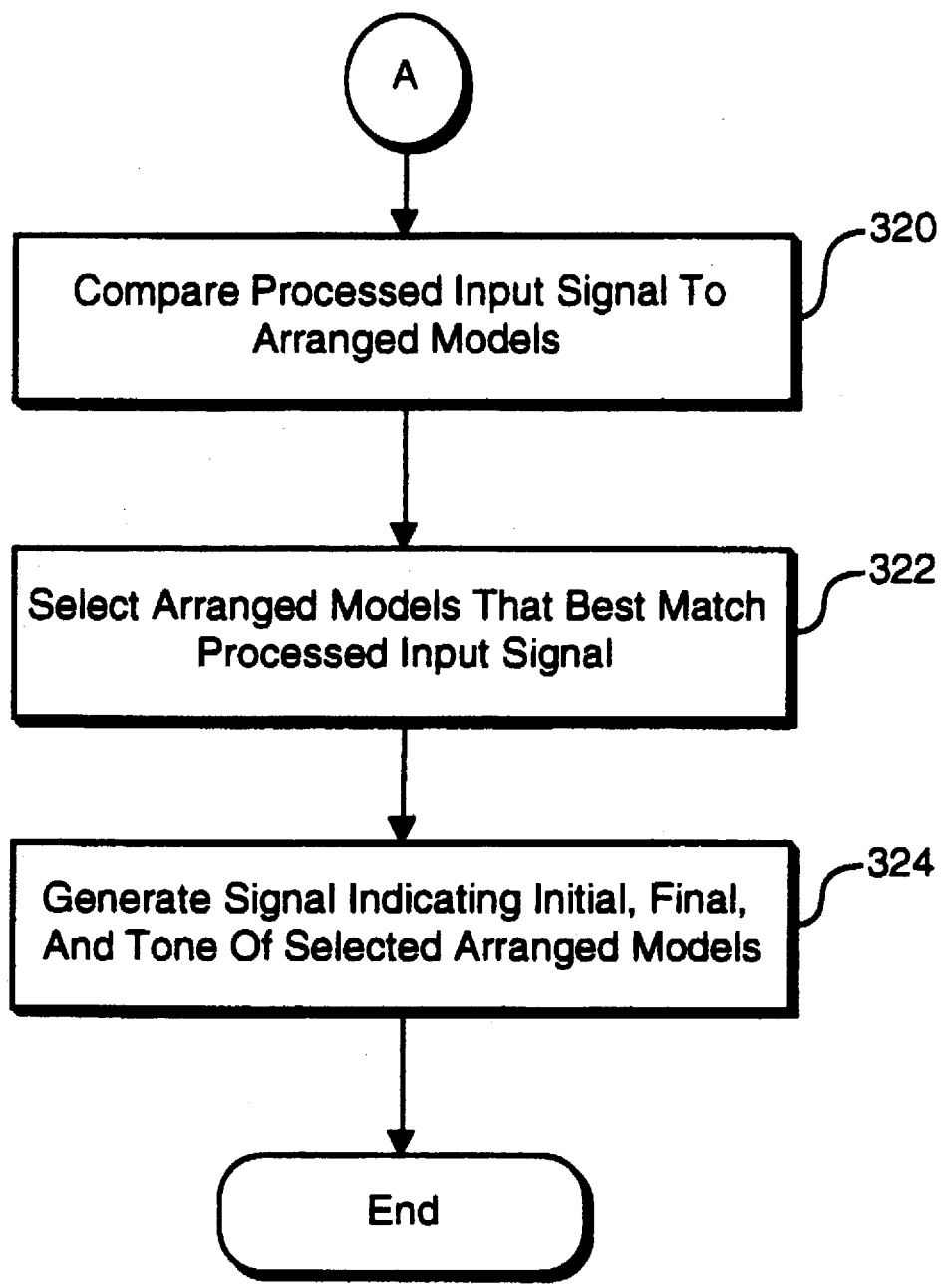

Referring now to FIGS. 10A and 10B, flow charts of a method of recognizing a syllable of Mandarin Chinese speech is shown. The method begins in step 300 where the system 16 receives an input audio signal of a syllable of Mandarin Chinese speech. The micro-phone of the input device 20 converts the audio signal into an analog, electrical signal. The A/D converter of the input device 20 then converts the analog, electrical signal into a digital, electrical signal. In step 302, the pre-processor 32 of the speech recognition system 30 receives the digital, electrical signal for pre-processing. The pre-processor 32 determines a FFT of the digital, electrical signal, determines a vector quantization of the FFT. The pre-processor 32 may alternately determine an LPC in place of the FFT. In step 304, the speech determinator 38 selects a final of Mandarin Chinese that it has not yet selected. Step 304 is executed multiple times by the method; the first time step 304 is executed, the speech determinator 38 may select any final of Mandarin Chinese. On future executions, the speech determinator 38 selects a final that it has not yet selected. In the same way, the speech determinator 38 selects a tone of Mandarin Chinese in step 306 and selects an initial in step 308. In step 310 the speech determinator 38 determines if the selected initial, final, and tone are a valid syllable of Mandarin Chinese speech. The speech determinator 38 determines the validity of the combination by comparing the combination to the syllables of Mandarin Chinese speech that it received from the speech identifier 36. If the combination is a valid syllable, the speech determinator 38, in step 312, selects the model of the initial, dependent on the final and tone, and selects the model of the final, dependent on the initial and tone, and joins the two models together. The speech determinator 38 receives the models from the HMM storage 34. The speech determinator 38 then stores the joined models within itself. From step 312 the method proceeds to step 314. The method also proceeds to step 314 from step 310 if the combination is not a valid syllable. In alternate methods, the speech determinator 38 may join models that are dependent on tone only, dependent on associated final or initial only, or context independent.

In step 314, the speech determinator 38 determines if there is another initial that has not been matched with the currently selected final and tone. If there is such an initial, the method returns to step 308 to select another initial that has not yet been matched with the currently selected final and tone. If there is not another such initial, the method proceeds to step 316 where the speech determinator 38 determines if there is another tone that has not been matched with the currently selected final. If there is such a tone, the method returns to step 306 where the speech determinator 38 selects a tone that has not yet been matched with the currently selected final. When the speech determinator 38 selects a tone, it re-sets the initials so that all initials are matched with the current final and the just selected tone. If in step 316 there are no such tones, the method proceeds to step 318 where the speech determinator 38 determines if there are finals that have not been compared to the syllables received from the speech identifier 36. If there are such finals, the method returns to step 304 where the speech determinator 38 selects a final that has not yet been compared to the syllables received from the speech identifier 36. When the speech determinator selects a final, it re-sets the initials and tones so that all initials and tones are combined with the newly selected final and compared to the syllables received from the speech identifier 36.

If in step 318 there are no such finals, the speech determinator 38 has paired the models together to form all valid syllables of Mandarin Chinese speech. The method continues in step 320 where the speech determinator 38 compares the processed input signal to the joined models. The speech determinator 38 viterbi search, or dynamic programming, to compare the processed input signal to the joined models. There are many other techniques for making this comparison; those skilled in the art will recognize these techniques. Context dependency yields a comparison that compares the whole input signal to the whole joined model, that uses detailed context dependent models for initials and finals that are co-articulated by different contexts (initial, final, and tones). By using models that are dependent on tone, the method includes an additional dimension in the comparison, the comparison of the whole to a model co-articulated by different tones. Thus, with the most detailed models, the present invention adds three dimensions to the comparison of step 320, making the determination of step 322 more accurate. The use of less detailed models, such as models dependent on tone only, correspondingly reduces the dimensionality of the comparison of step 320. This makes the determination of step 322 less accurate but still more accurate than when using context independent models. In step 322, the speech determinator 38 selects the arrangement of models that best matches the processed input, and in step 324, the speech determinator 38 generates and outputs a signal that indicates the initial, final, and tone of the joined model selected in step 322. The method then ends.

Figure 11A:
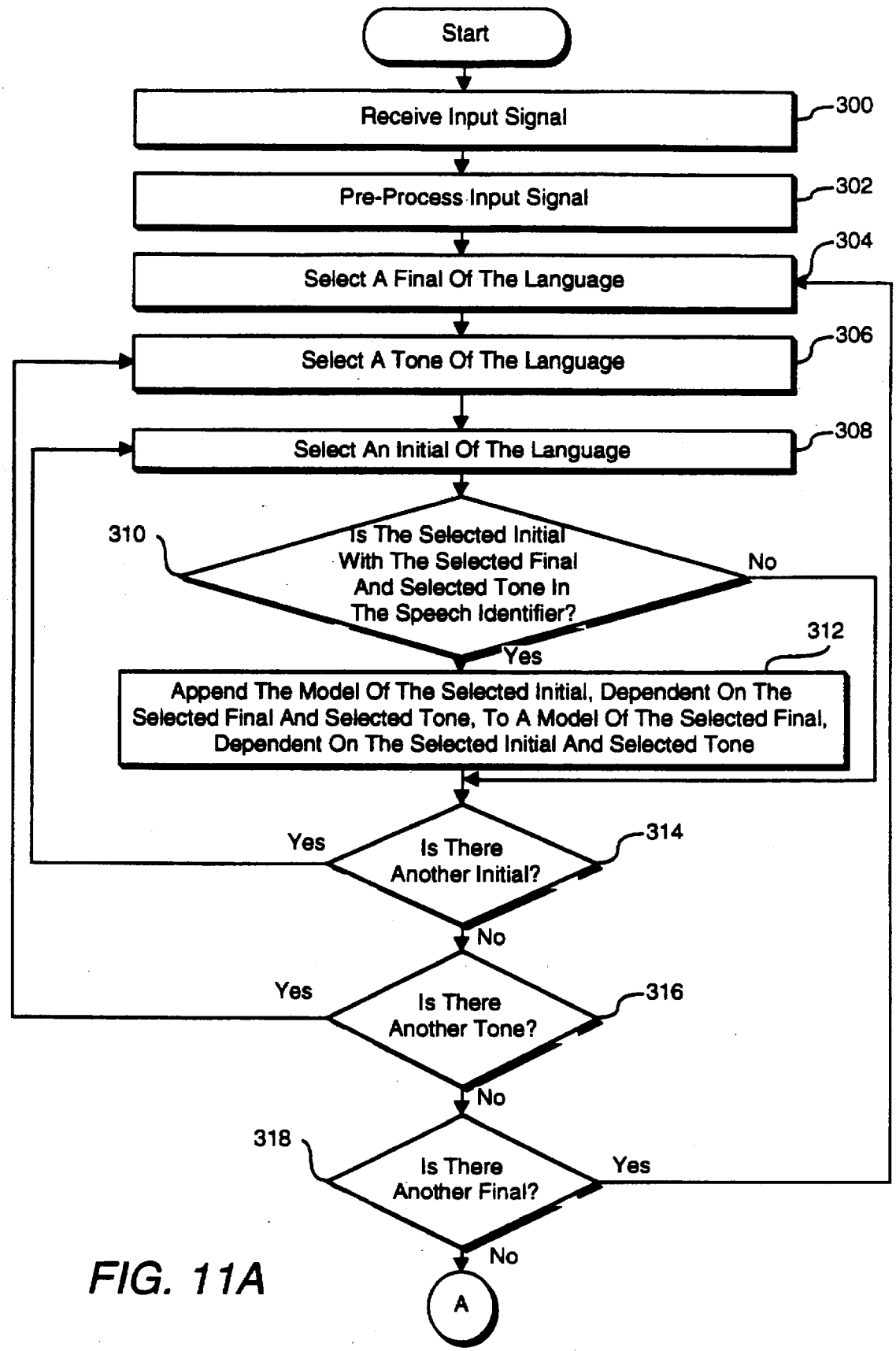
FIGS. 11A, 11B, and 11C are flow charts showing a method for recognizing syllables and lone finals according to the present invention.
Figure 11B:
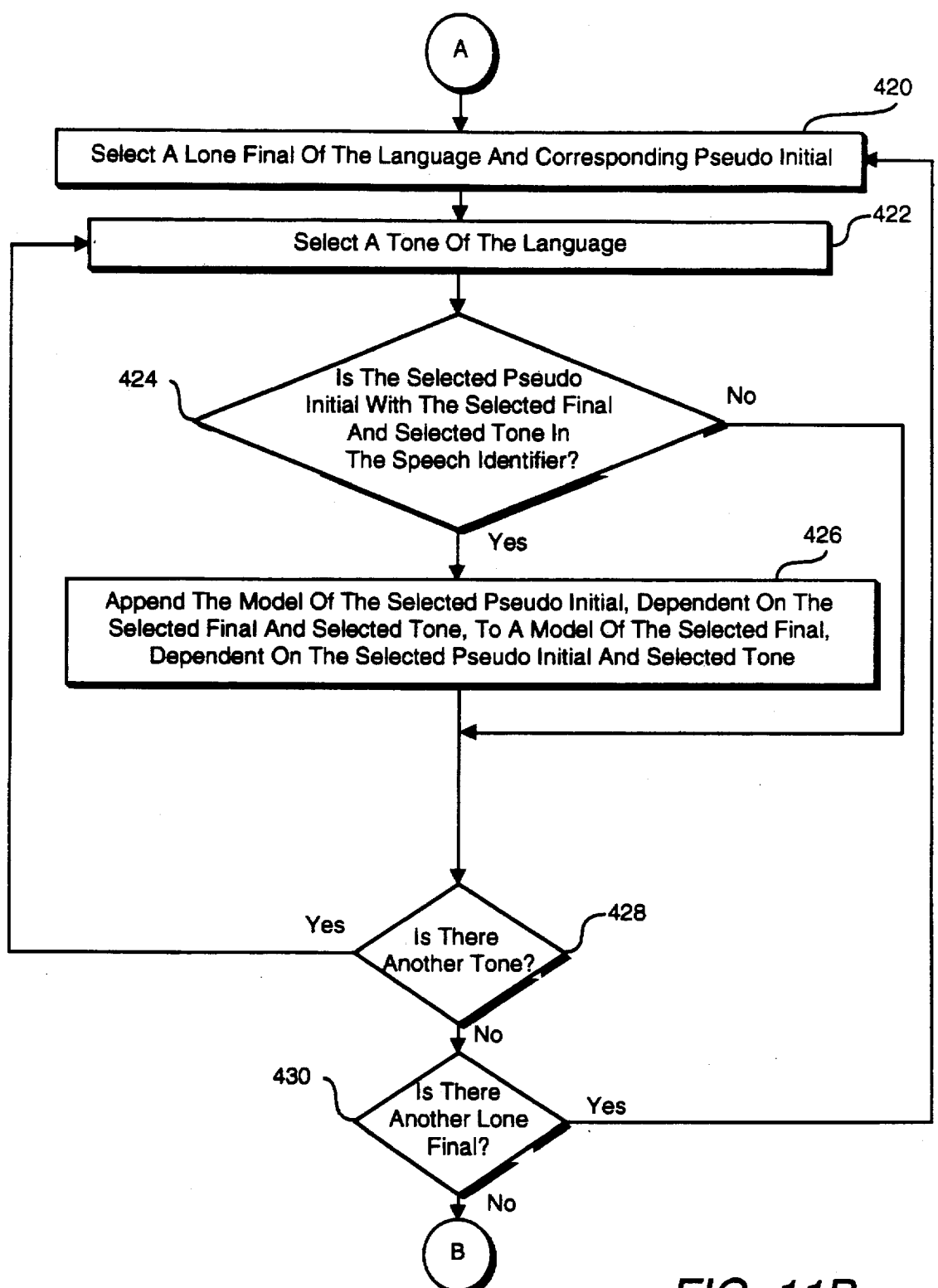
Figure 11C:
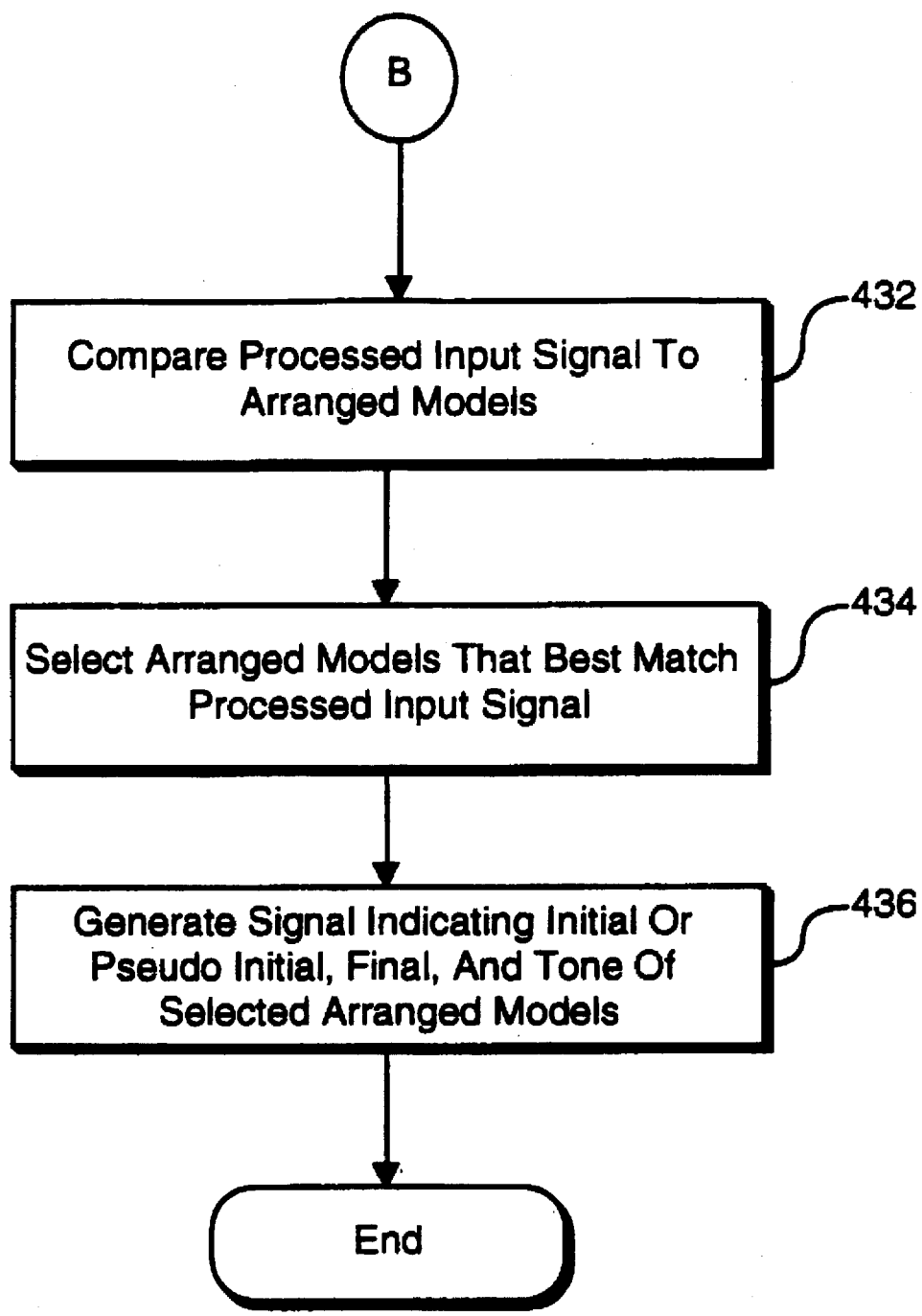

Referring now to FIGS. 11A, 11B, and 11C, flow charts of a method for recognizing syllables of Mandarin Chinese speech, using the present invention for recognizing syllables that are lone finals, is shown. The method begins with the same steps as shown in FIG. 10A. For convenience, identical method steps have identical numerals. The first unique method step is step 420 which follows step 318. In step 420, the speech determinator 38 selects a lone final and corresponding pseudo initial that it has not yet selected. In step 422, the speech determinator 38 selects a tone that it has not yet selected for this lone final. Next, in step 424, the speech determinator 38 determines if the selected lone final and selected tone are a valid syllable. The speech determinator 38 compares the selected lone final and selected tone to the syllables received from the speech identifier 36 to make this determination. If the selected lone final and selected tone are a valid syllable, the method proceeds to step 426 where the speech determinator 38 appends the model of the pseudo initial, dependent on the selected final and selected tone, to the model of the final, dependent on the pseudo initial and selected tone. The models are received from the HMM storage 34. From step 426 the method proceeds to step 428; also, if in step 424 the selected lone final and selected tone were not a valid syllable, the method proceeds to step 428. In step 428 the speech determinator 38 determines if there is another tone that has not yet been combined with the current lone final. If there is such a tone, the method returns to step 422 to select a tone that has not yet been combined with the lone final. If in step 428 there is no such tone, the method continues in step 430 where the speech determinator 38 determines if there is another lone final to be analyzed. If there is such a lone final, the method returns to step 420 where the speech determinator 38 selects a lone final that has not yet been analyzed. If, in step 430, there is no such lone final, the speech determinator 38 compares the processed input signal to the arranged models of initials and finals and of pseudo initials and lone finals in step 432. The speech determinator 38 uses the same techniques, such as a viterbi search, as were used in step 320 to make the comparison. In step 434, the speech determinator 38 selects the arranged models that best match the processed input. Finally, the speech determinator 38 generates and outputs, in step 434, a signal indicating the initial, or pseudo initial, final, and tone of the selected arranged models. The method then ends.

Figure 12:
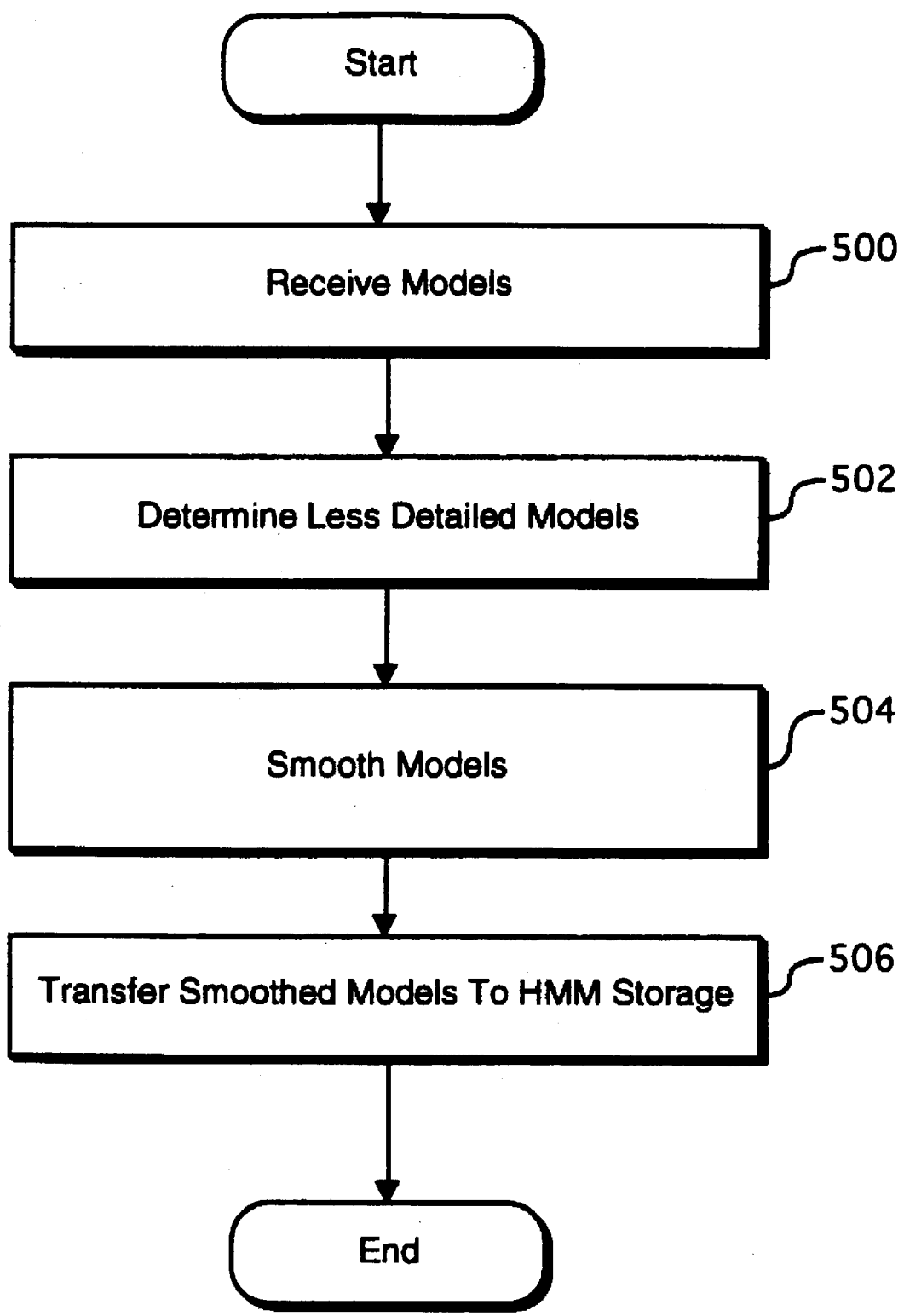
FIG. 12 is a flow chart showing a method for smoothing models according to the present invention.

Referring now to FIG. 12, a flow chart of a method for smoothing models of initials, finals, and pseudo initials, according to the present invention, is shown. The method begins in step 500 where the smoother 42 receives the models from the HMM storage 34. The smoother 42 smoothes the models according to groups, that is the first group 62, the second group 64, and the third group 66. The smoother 42 may either receive the models one group at a time or may receive all models at once but smooth them by groups. In step 502, the LDM generator 46 generates less detailed models. The LDM generator 46 generates a less detailed model from the more detailed models. The LDM generator 46 determines an arithmetic mean of similar models having common dependencies to generate a less detailed model. For example, the LDM generator 46 determines an arithmetic mean of the model of $i_1$, dependent on $f_1$ and $T_1$, and of the model of $i_1$, dependent on $f_1$ and $T_2$, to generate a model of $i_1$, dependent on $f_1$ and independent of tone. The LDM generator 46 determines an arithmetic mean of the models on a point by point basis. The LDM generator 46 averages model values of corresponding points of the more detailed models to find the model value of the corresponding point of the less detailed model.

Once the LDM generator 46 has generated the less detailed models, it transfers the less detailed models to the detailed model modifier 48. In step 504, the detailed model modifier 48 receives the more detailed models from the group storage 44 and smoothes the more detailed models with the less detailed models. The detailed model modifier 48 uses conventional smoothing techniques to smooth the more detailed models. The smoother 42 then, in step 506, transfers the smoothed models to the HMM storage 34 where they replace the un-smoothed models, and the method ends.

Figure 13A:
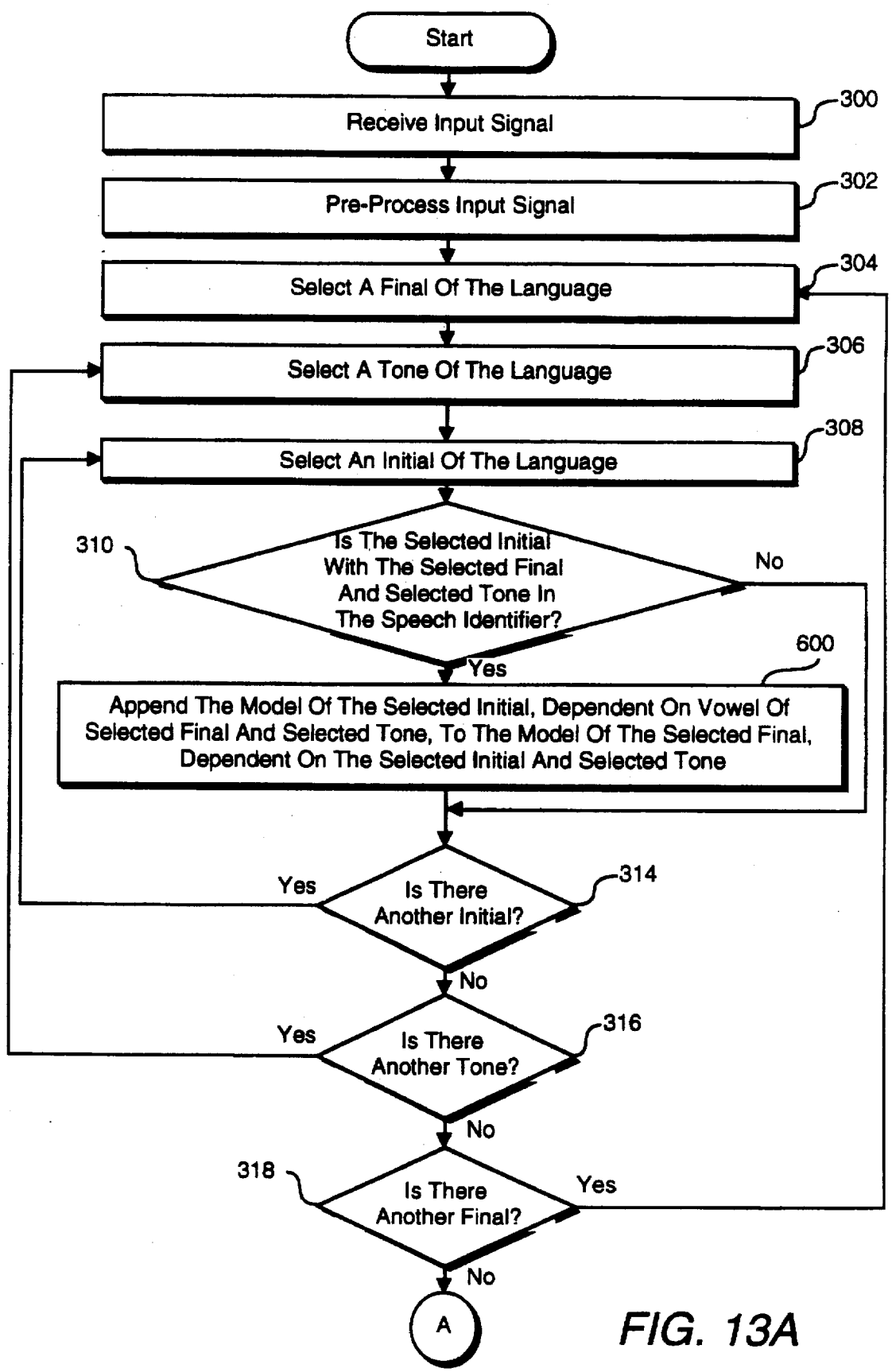
FIGS. 13A and 13B are flow charts showing a method for recognizing syllables of Mandarin Chinese speech where models of initials are dependent on the beginning vowels of finals.
Figure 13B:
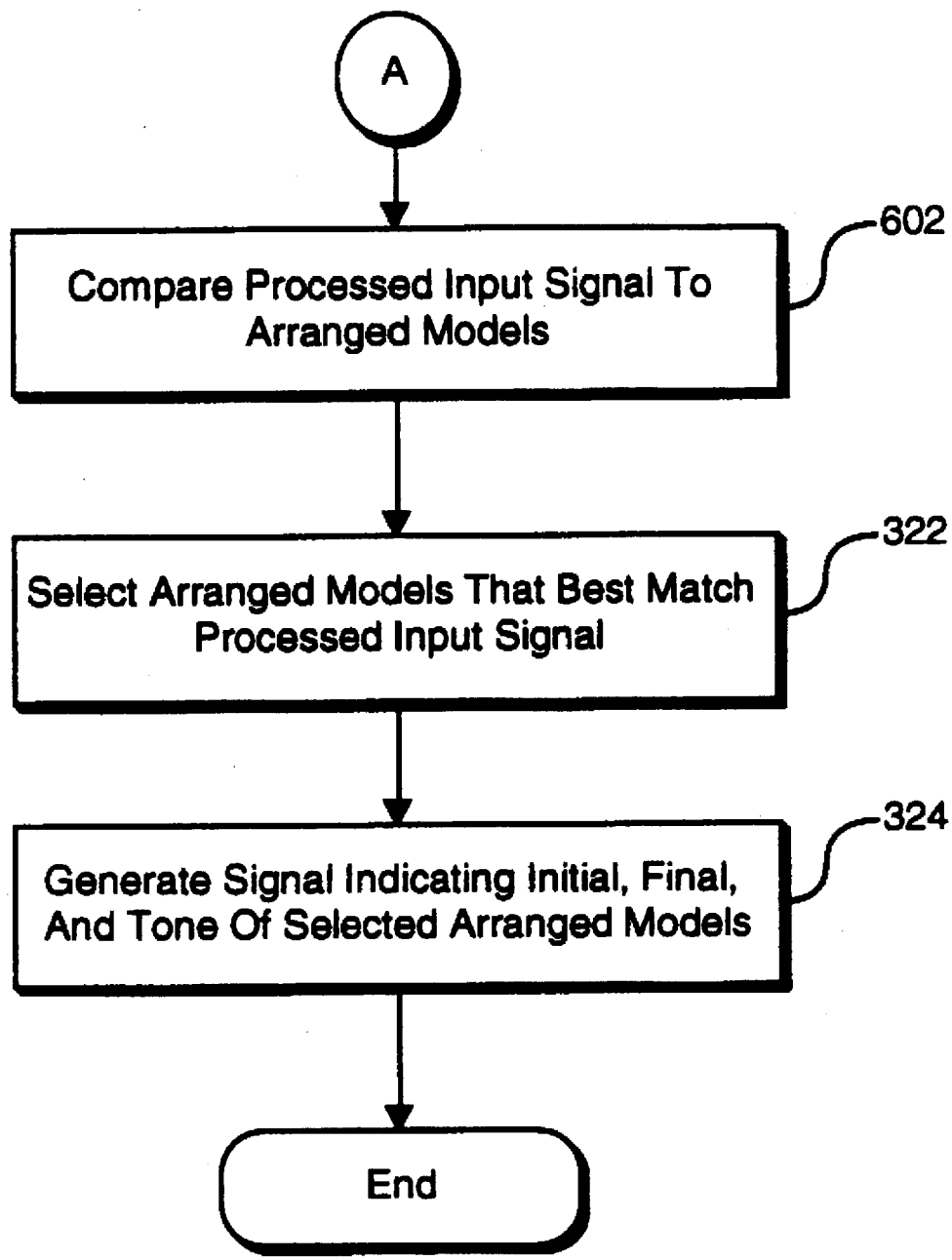

Referring now to FIGS. 13A and 13B, flow charts of a method for recognizing a syllable of Mandarin Chinese speech, according to the present invention, is shown. The method is substantially similar to that shown in FIGS. 10A and 10B, and for convenience identical numerals are used to identify identical steps. The first step, not identical to the corresponding step in FIGS. 10A and 10B, is step 600 which follows step 310 and precedes step 314. In step 600, the speech identifier 38 joins a model of an initial, which depends on the tone of the syllable and on the beginning vowel of the associated final, with a model of a final that depends on the tone of the syllable and on the initial. The other method step, which differs from the corresponding step in FIGS. 10A and 10B, is step 602 where the speech determinator 38 compares the processed input to the arranged models. In step 602, the speech determinator 38 compares the processed input to models where the initials that depend only on the tone of the syllable and on the beginning vowel of the final with which the model of the initial is joined.

APPENDIX A

| Pesudo-Initial | Final | Syllable |
|---|---|---|
| AH_A | A_1 | A1 |
| AH_A | A_2 | A2 |
| AH_A | A_3 | A3 |
| AH_A | A_4 | A4 |
| AH_A | A_5 | A5 |
| AH_A | AI_1 | AI1 |
| AH_A | AI_2 | AI2 |
| AH_A | AI_3 | AI3 |
| AH_A | AI_4 | AI4 |
| AH_A | AN_1 | AN1 |
| AH_A | AN_3 | AN3 |
| AH_A | AN_4 | AN4 |
| AH_A | ANG_1 | ANG1 |
| AH_A | ANG_2 | ANG2 |
| AH_A | ANG_4 | ANG4 |
| AH_A | AO_1 | AO1 |
| AH_A | AO_2 | AO2 |
| AH_A | AO_3 | AO3 |
| AH_A | AO_4 | AO4 |
| EH_E | E_1 | E1 |
| EH_E | E_2 | E2 |
| EH_E | E_3 | E3 |
| EH_E | E_4 | E4 |
| EH_E | EN_1 | EN1 |
| EH_E | EN_4 | EN4 |
| EH_E | ER_2 | ER2 |
| EH_E | ER_3 | ER3 |
| EH_E | ER_4 | ER4 |
| OH_O | OU_1 | OU1 |
| OH_O | OU_3 | OU3 |
| OH_O | OU_4 | OU4 |
| WH_U | UA_1 | WA1 |
| WH_U | UA_2 | WA2 |
| WH_U | UA_3 | WA3 |
| WH_U | UA_4 | WA4 |
| WH_U | UAI_1 | WAI1 |
| WH_U | UAI_3 | WAI3 |
| WH_U | UAI_4 | WAI4 |
| WH_U | UAN_1 | WAN1 |
| WH_U | UAN_2 | WAN2 |
| WH_U | UAN_3 | WAN3 |
| WH_U | UAN_4 | WAN4 |
| WH_U | UANG_1 | WANG1 |
| WH_U | UANG_2 | WANG2 |
| WH_U | UANG_3 | WANG3 |
| WH_U | UANG_4 | WANG4 |
| WH_U | UI_1 | WEI1 |
| WH_U | UI_2 | WEI2 |
| WH_U | UI_3 | WEI3 |
| WH_U | UI_4 | WEI4 |
| WH_U | UN_1 | WEN1 |
| WH_U | UN_2 | WEN2 |
| WH_U | UN_3 | WEN3 |
| WH_U | UN_4 | WEN4 |
| WH_U | UENG_1 | WENG1 |
| WH_U | UENG_3 | WENG3 |
| WH_U | UENG_4 | WENG4 |
| WH_U | UO_1 | WO1 |
| WH_U | UO_3 | WO3 |
| WH_U | UO_4 | WO4 |
| WH_U | U_1 | WU1 |
| WH_U | U_2 | WU2 |
| WH_U | U_3 | WU3 |
| WH_U | U_4 | WU4 |
| YH_I | IA_1 | YA1 |
| YH_I | IA_2 | YA2 |
| YH_I | IA_3 | YA3 |
| YH_I | IA_4 | YA4 |
| YH_I | IAN_1 | YAN1 |
| YH_I | IAN_2 | YAN2 |
| YH_I | IAN_3 | YAN3 |
| YH_I | IAN_4 | YAN4 |
| YH_I | IANG_1 | YANG1 |
| YH_I | IANG_2 | YANG2 |
| YH_I | IANG_3 | YANG3 |
| YH_I | IANG_4 | YANG4 |
| YH_I | IAO_1 | YAO1 |
| YH_I | IAO_2 | YAO2 |
| YH_I | IAO_3 | YAO3 |
| YH_I | IAO_4 | YAO4 |
| YH_I | IE_1 | YE1 |
| YH_I | IE_2 | YE2 |
| YH_I | IE_3 | YE3 |
| YH_I | IE_4 | YE4 |
| YH_I | I_1 | YI1 |
| YH_I | I_2 | YI2 |
| YH_I | I_3 | YI3 |
| YH_I | I_4 | YI4 |
| YH_I | IN_1 | YIN1 |
| YH_I | IN_2 | YIN2 |
| YH_I | IN_3 | YIN3 |
| YH_I | IN_4 | YIN4 |
| YH_I | ING_1 | YING1 |
| YH_I | ING_2 | YING2 |
| YH_I | ING_3 | YING3 |
| YH_I | ING_4 | YING4 |
| YH_I | IONG_1 | YONG1 |
| YH_I | IONG_2 | YONG2 |
| YH_I | IONG_3 | YONG3 |
| YH_I | IONG_4 | YONG4 |
| YH_I | IU_1 | YOU1 |
| YH_I | IU_2 | YOU2 |
| YH_I | IU_3 | YOU3 |
| YH_I | IU_4 | YOU4 |
| VH_V | VV_1 | YU1 |
| VH_V | VV_2 | YU2 |
| VH_V | VV_3 | YU3 |
| VH_V | VV_4 | YU4 |
| VH_V | VVAN_1 | YUAN1 |
| VH_V | VVAN_2 | YUAN2 |
| VH_V | VVAN_3 | YUAN3 |
| VH_V | VVAN_4 | YUAN4 |
| VH_V | VVE_1 | YUE1 |
| VH_V | VE_4 | YUE4 |
| VH_V | VVN_1 | YUN1 |
| VH_V | VVN_2 | YUN2 |
| VH_V | VVN_3 | YUN3 |
| VH_V | VVN_4 | YUN4 |

What is claimed is:

1. A speech recognition system for recognizing syllables of a language, the syllables of the language each being formed from an initial sub-syllable and a final sub-syllable, the speech recognition system comprising:

a speech identifier for storing a plurality of valid combinations of initial sub-syllables and final sub-syllables;

a storage device for storing a plurality of initial sub-syllable models and final sub-syllable models; and a speech determinator for receiving:

an input signal to be recognized via a first input;

the plurality of valid combinations from the speech identifier via a second input; and the plurality of models from the storage device via a third input;

wherein, after the speech determinator receives the input signal, the plurality of valid combinations and the plurality of models, the speech determinator creates appended models from the received plurality of models according to the received plurality of valid combinations, each appended model comprising a final sub-syllable model appended to the end of an initial sub-syllable model, compares the input signal to each appended model, and then generates and outputs a signal indicating one of the appended models that most closely matches the input signal.

2. The speech recognition system of claim 1, wherein:
the speech identifier stores at least one valid combination of a pseudo initial sub-syllable and a final sub-syllable and; the storage device stores a plurality of pseudo initial sub-syllable models.

3. The speech recognition system of claim 1, wherein the storage device stores a model of an initial sub-syllable that is dependent on a final sub-syllable and stores a model of the final sub-syllable that is dependent on the initial sub-syllable.

4. The speech recognition system of claim 3, wherein the storage device stores a model of an initial sub-syllable that is dependent on a final sub-syllable.

5. The speech recognition system of claim 3, wherein the storage device stores a model of a final sub-syllable that is dependent on an initial sub-syllable.

6. The speech recognition system of claim 3, wherein the input signal has a tone and
the storage device stores a model of an initial sub-syllable that is dependent on a tone that a syllable may have.

7. The speech recognition system of claim 3, wherein the input signal has a tone and
the storage device stores a model of a final sub-syllable that is dependent on a tone that a syllable may have.

8. The speech recognition system of claim 3, wherein
the storage device stores a model of an initial sub-syllable that is dependent on the beginning vowel of a final sub-syllable.

9. The speech recognition system of claim 3, wherein the storage device stores hidden Markov models.

10. The speech recognition system of claim 3, wherein the speech identifier is a memory device that stores pairs of initial sub-syllables and final sub-syllables that form valid syllables of the language.

11. The speech recognition system of claim 3, wherein the storage device stores a plurality of models of pseudo initial sub-syllables.

12. The speech recognition system of claim 3, further comprising a smoother coupled to said storage device to receive a model stored in said storage device and to transmit a modified model for storage in said storage device to replace said received model, said modified model more closely matching said syllables of said language than said received model.

13. A method of recognizing an input signal including a syllable of a language, the syllable having an initial sub-syllable and a final sub-syllable, the method comprising the steps of:
receiving the input signal;
receiving a plurality of valid combinations of initial sub-syllables and final sub-syllables;
receiving a plurality of initial sub-syllable models and final sub-syllable models;
creating appended models from the received plurality of models according to the received plurality of valid combinations, each appended model comprising a final sub-syllable model appended to the end of an initial sub-syllable model;
comparing the input signal to each appended model; and
generating a signal indicating one of the appended models that most closely matches the input signal.

14. The method of claim 13, further comprising the step of joining models of pseudo initial sub-syllable to models of final sub-syllables.

15. The method of claim 13, wherein the models of the final sub-syllables are joined to models of initial sub-syllables that are dependent on final sub-syllables.

16. The method of claim 13, wherein the models of the initial sub-syllables are joined to models of final sub-syllables that are dependent on initial sub-syllables.

17. The method of claim 16, further comprising the steps of:
comparing an initial sub-syllable of the input signal to models of initial sub-syllables that are dependent on a tone of the language;
comparing the final sub-syllable of the input signal to models of final sub-syllables that are dependent on a tone of the language;
comparing the final sub-syllable of the input signal to models of final sub-syllables that are dependent on an initial sub-syllable; and
generating a signal indicating the tone of the joined models that most closely matches the input signal.

18. The method of claim 13, wherein the models of initial sub-syllables are dependent on a tone of the language.

19. The method of claim 13, wherein the models of final sub-syllables are dependent on a tone of the language.

20. A system for recognizing an input signal including a syllable of a language, the syllable having an initial sub-syllable and a final sub-syllable, the system comprising:
means for receiving the input signal;
means for receiving a plurality of valid combinations of initial sub-syllables and final sub-syllables;
means for receiving a plurality of initial sub-syllable models and final sub-syllable models;
means for creating appended models from the received plurality of models according to the received plurality of valid combinations, each appended model comprising a final sub-syllable model appended to the end of an initial sub-syllable model;
means for comparing the input signal to each appended model; and
means for generating a signal indicating one of the appended models that most closely matches the input signal.

21. The system of claim 20, further comprising means for joining models of pseudo initial sub-syllable to models of final sub-syllables.

22. The system of claim 20, wherein the models of the final sub-syllables are joined to models of initial sub-syllables that are dependent on final sub-syllables.

23. The system of claim 20, wherein the models of the initial sub-syllables are joined to models of final sub-syllables that are dependent on initial sub-syllables.

24. The system of claim 23, further comprising:
means for comparing an initial sub-syllable of the input signal to models of initial sub-syllables that are dependent on a tone of the language;
means for comparing the final sub-syllable of the input signal to models of final sub-syllables that are dependent on a tone of the language;
means for comparing the final sub-syllable of the input signal to models of final sub-syllables that are dependent on an initial sub-syllable; and
means for generating a signal indicating the tone of the joined models that most closely matches the input signal.

25. The system of claim 20, wherein the models of initial sub-syllables are dependent on a tone of the language.

26. The system of claim 20, wherein the models of final sub-syllables are dependent on a tone of the language.

* * * * *